US010051154B2

(12) United States Patent
Sugiyama et al.

(10) Patent No.: US 10,051,154 B2
(45) Date of Patent: Aug. 14, 2018

(54) INFORMATION PROCESSING APPARATUS, CONTROL METHOD IN INFORMATION PROCESSING APPARATUS, AND IMAGE PROCESSING APPARATUS

(71) Applicant: CANON KABUSHIKI KAISHA, Tokyo (JP)

(72) Inventors: Hideki Sugiyama, Kawasaki (JP); Fumitoshi Ito, Kawasaki (JP); Masayuki Sato, Tokyo (JP); Satoki Watariuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/386,584

(22) Filed: Dec. 21, 2016

(65) Prior Publication Data

US 2017/0201651 A1 Jul. 13, 2017

(30) Foreign Application Priority Data

Jan. 13, 2016 (JP) .................................. 2016-004614
Sep. 21, 2016 (JP) .................................. 2016-184689

(51) Int. Cl.
*H04N 1/44* (2006.01)
*H04L 29/08* (2006.01)
*H04N 1/00* (2006.01)

(52) U.S. Cl.
CPC .......... *H04N 1/4433* (2013.01); *H04L 67/02* (2013.01); *H04L 67/327* (2013.01); *H04L 67/34* (2013.01); *H04N 1/00244* (2013.01); *H04N 1/00344* (2013.01); *H04N 1/00464* (2013.01); *H04N 1/00938* (2013.01); *H04N 2201/0094* (2013.01)

(58) Field of Classification Search
CPC .............................. H04N 1/4433; H04L 67/02
See application file for complete search history.

(56) References Cited

U.S. PATENT DOCUMENTS

| 7,457,839 B2 * | 11/2008 | Nakamura | G06F 9/445 358/1.16 |
|---|---|---|---|
| 7,685,521 B1 | 3/2010 | Ueda et al. | 715/722 |
| 8,400,658 B2 | 3/2013 | Ito | 358/1.15 |
| 8,947,699 B2 | 2/2015 | Ito | H04N 1/00464 |
| 9,148,529 B2 | 9/2015 | Ito | H04N 1/00222 |
| 9,360,815 B2 | 6/2016 | Sato | G03G 15/502 |
| 9,516,185 B2 | 12/2016 | Sugiyama | 358/1.15 |
| 2004/0109187 A1 * | 6/2004 | Matsushima | H04N 1/00 358/1.13 |
| 2011/0072356 A1 * | 3/2011 | Suwabe | H04N 1/00464 715/738 |
| 2011/0286044 A1 * | 11/2011 | Yuki | G06F 21/10 358/1.15 |

(Continued)

FOREIGN PATENT DOCUMENTS

JP 2015-230669 A 12/2015

*Primary Examiner* — Ibrahim Siddo
(74) *Attorney, Agent, or Firm* — Fitzpatrick, Cella, Harper & Scinto

(57) ABSTRACT

When a request for a service is made from a Web browser to a Web application, the Web application requests the service from a service provider of an MFP in accordance with the request. The service provider obtains a destination URL from the Web browser, and compares the destination URL with the URL of a service host written in a manifest file of a cooperation permission application. If those URLs match, the service provision is permitted.

16 Claims, 17 Drawing Sheets

(56) References Cited

U.S. PATENT DOCUMENTS

| | | | |
|---|---|---|---|
| 2012/0113453 A1 | 5/2012 | Ito | 358/1.13 |
| 2012/0194543 A1 | 8/2012 | Sato | 345/619 |
| 2015/0127644 A1* | 5/2015 | Wu | G06F 17/3089 |
| | | | 707/736 |
| 2015/0188748 A1 | 7/2015 | Watariuchi | H04L 41/046 |
| 2015/0373221 A1 | 12/2015 | Sugiyama | H04N 1/00885 |
| 2016/0026777 A1 | 1/2016 | Ito | G06F 21/105 |

\* cited by examiner

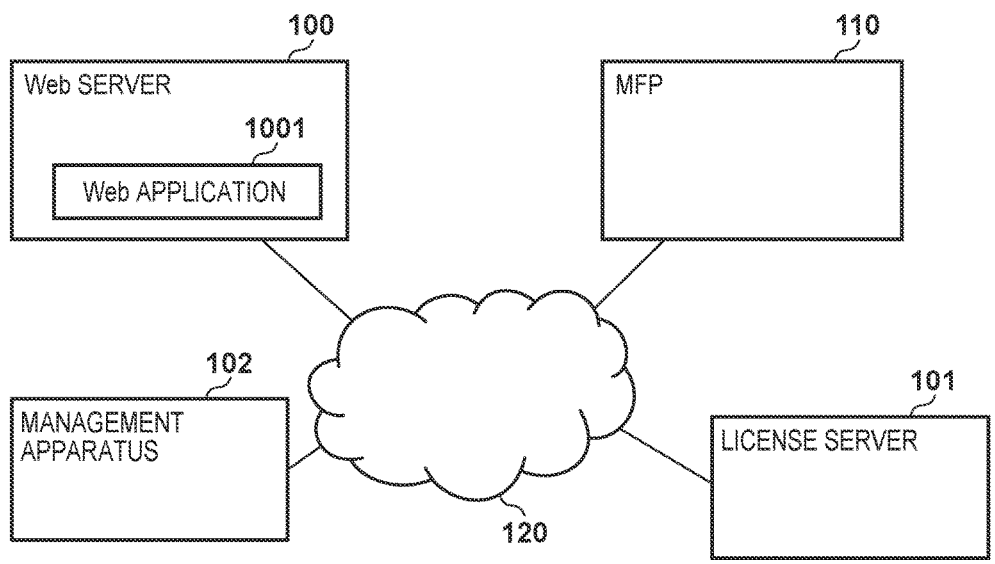
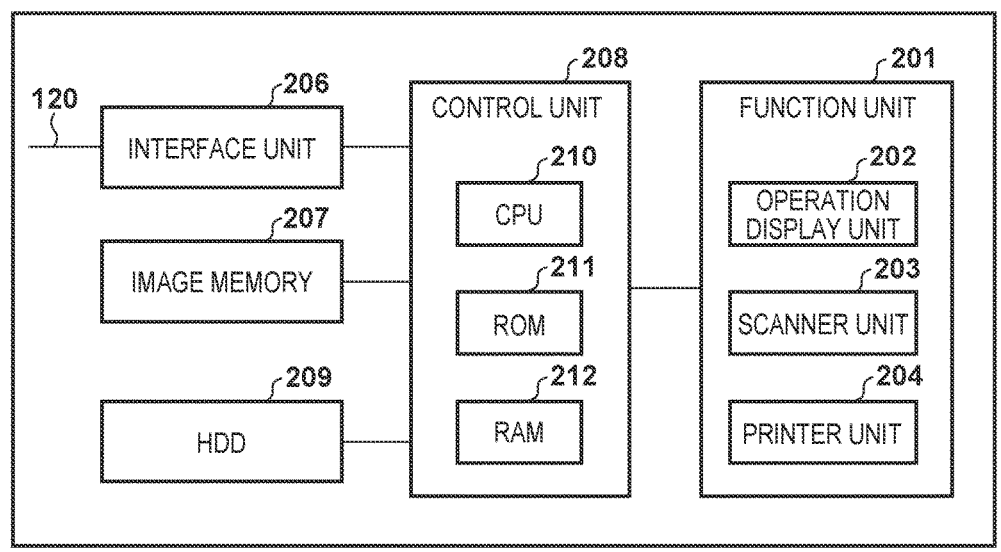

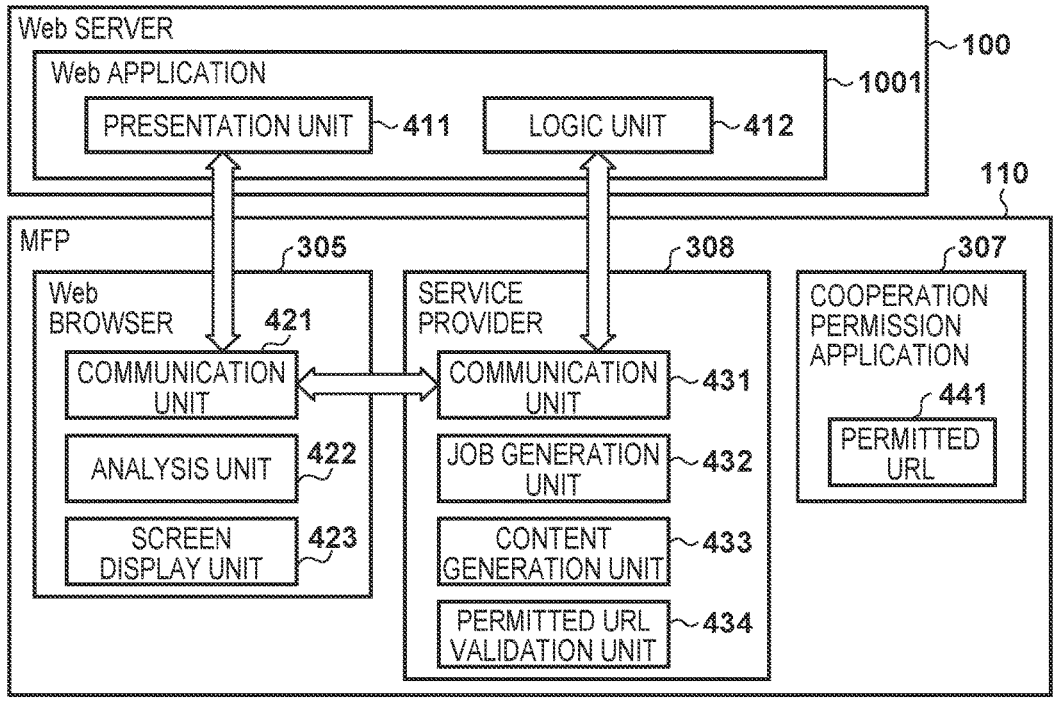
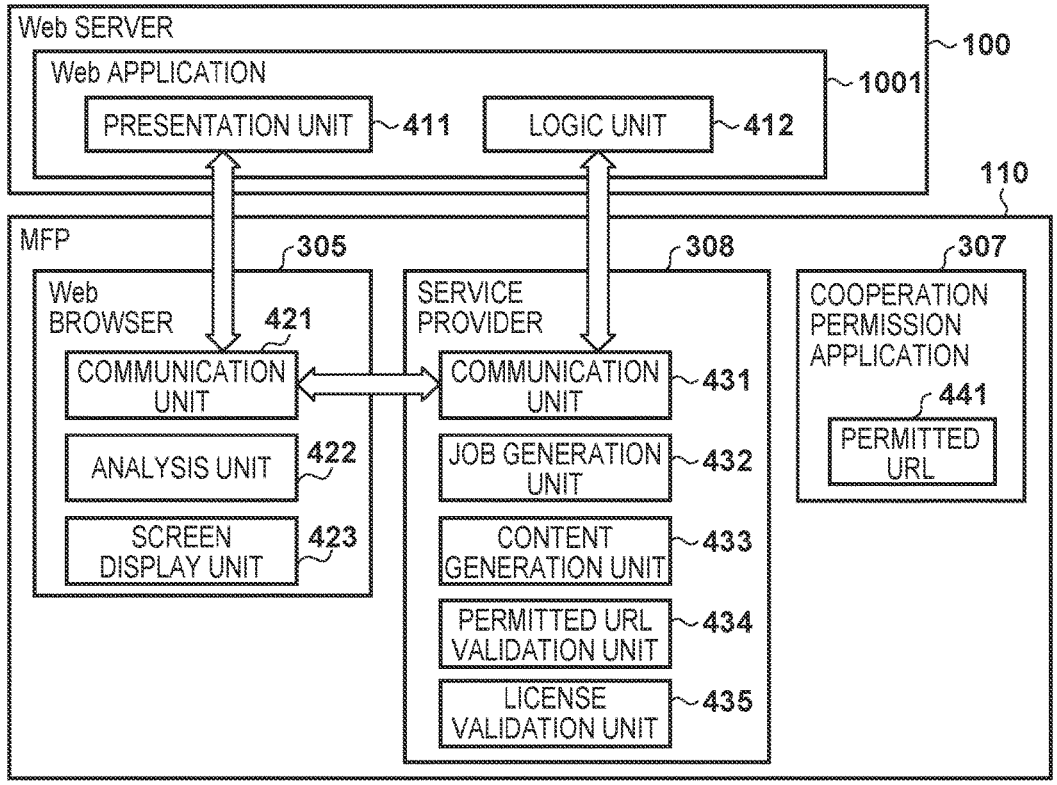

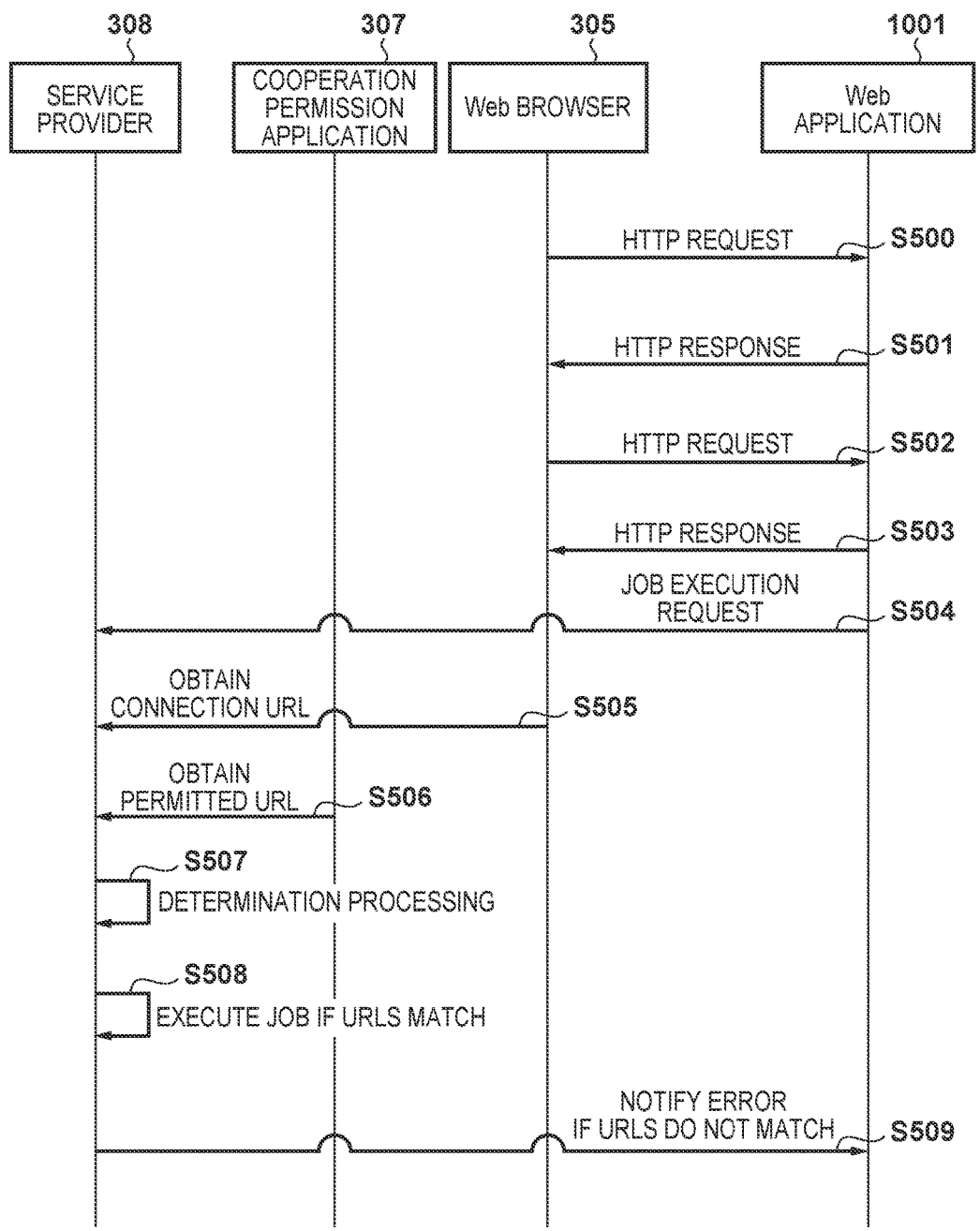

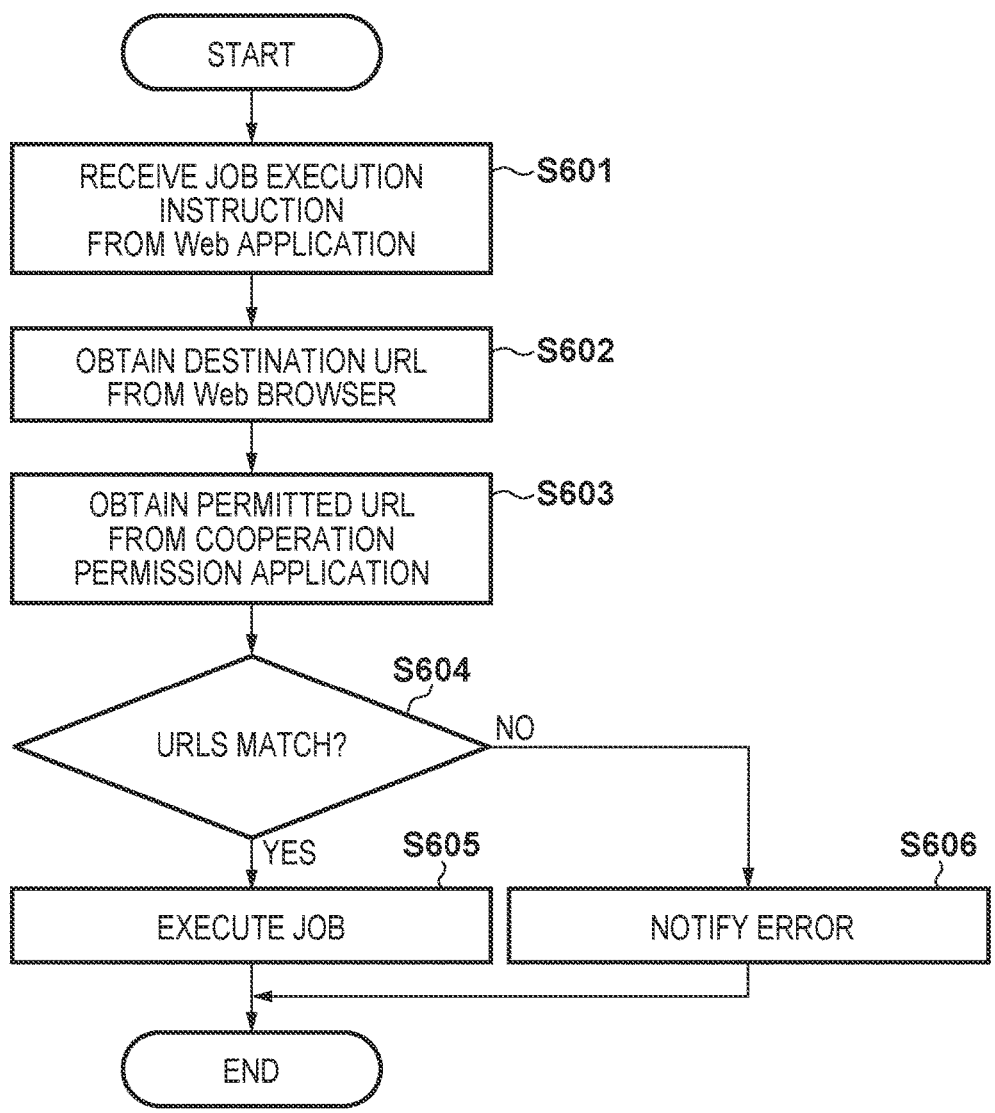

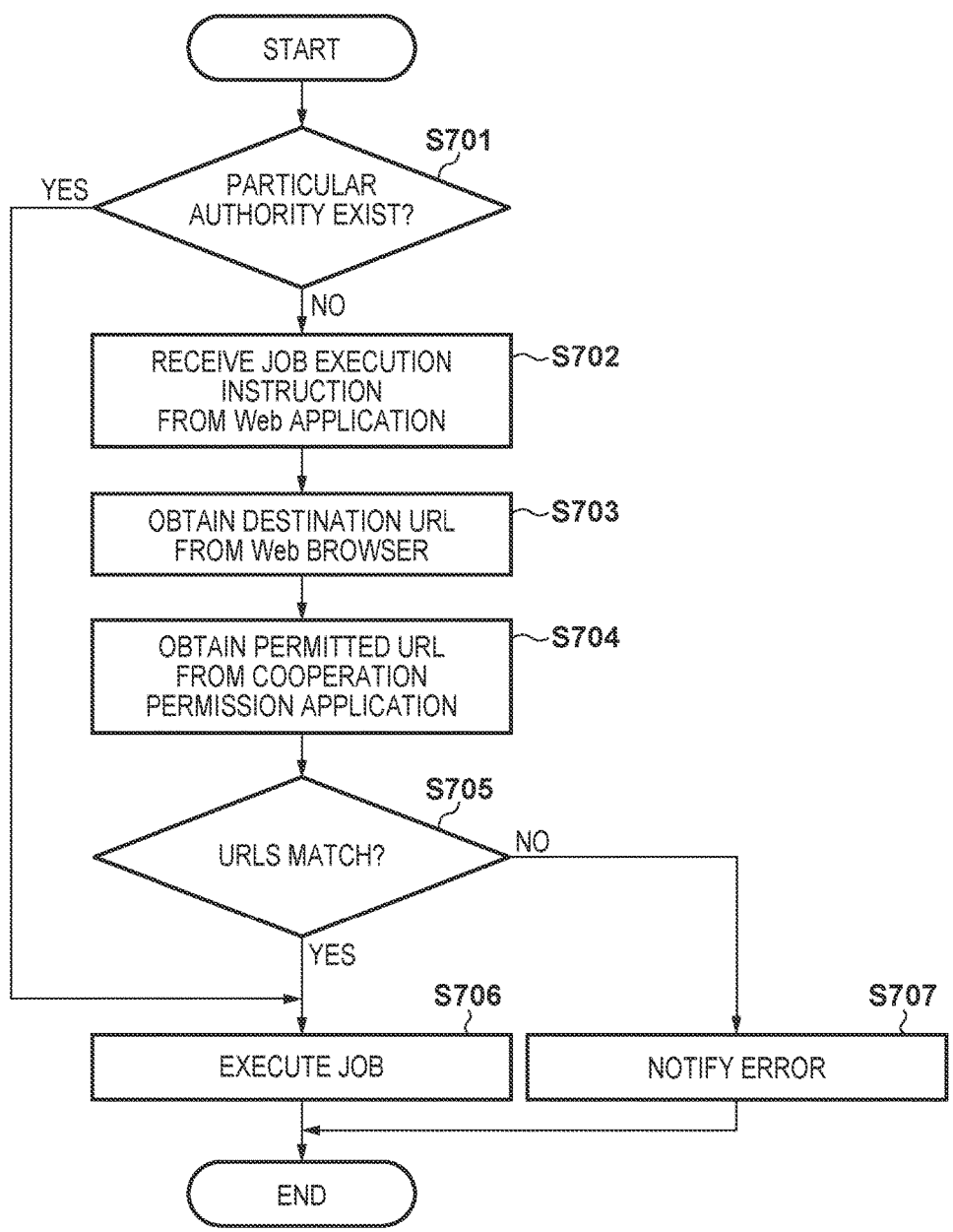

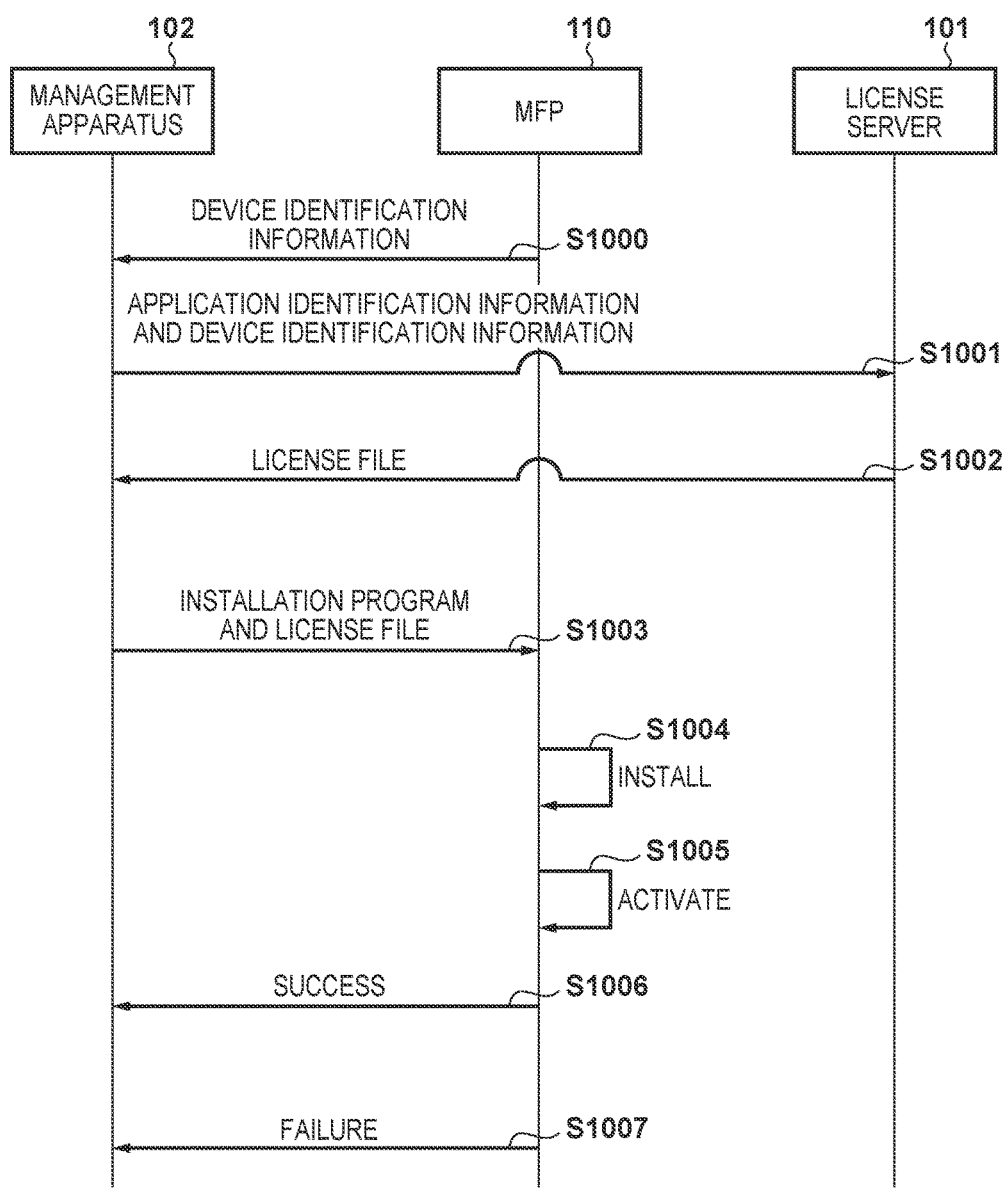

F I G. 16
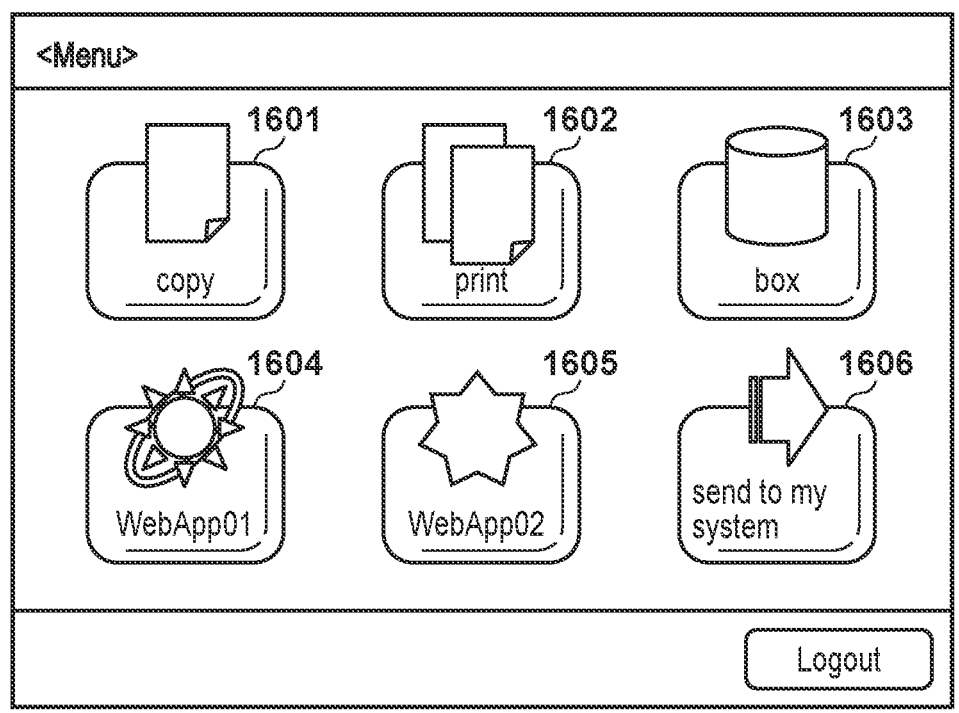

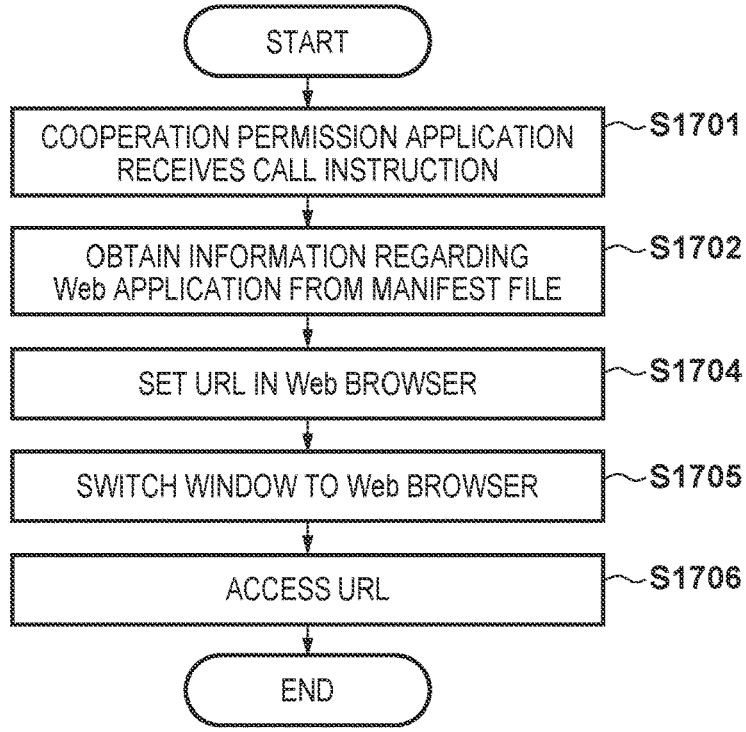
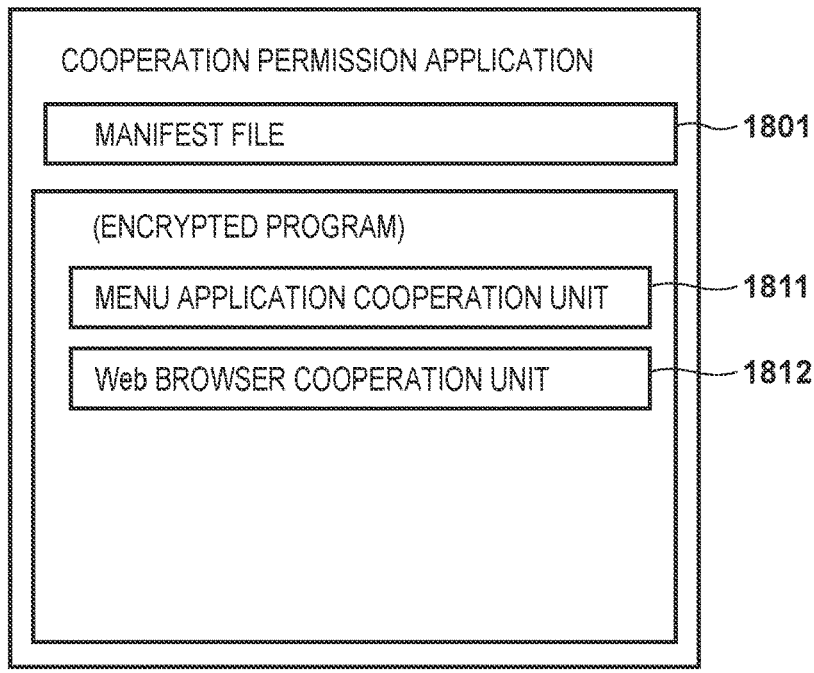

INFORMATION PROCESSING APPARATUS, CONTROL METHOD IN INFORMATION PROCESSING APPARATUS, AND IMAGE PROCESSING APPARATUS

BACKGROUND OF THE INVENTION

Field of the Invention

The present invention relates to an information processing apparatus, a control method in the information processing apparatus, and an image processing apparatus.

Description of the Related Art

In recent years, environments have been developed in which software is installed in image processing apparatuses and the functions of the image processing apparatuses are extended. Such software (body applications) can cooperate with an external service, and extend the functions of an image processing apparatus. As a conventional technique, a technique in which an image processing apparatus authenticates external services when accessing the external services, and uses only authenticated external services is proposed (Japanese Patent Laid-Open No. 2015-230669).

In a method disclosed in Japanese Patent Laid-Open No. 2015-230669, external services are authenticated when the external services are accessed, and thus it has been impossible to access an external service (Web application) and acquire screen information without use of an information processing apparatus by the external service (Web application), for example. In addition, in the case where it is envisioned to access an external service from a Web browser, there has been a problem in that a Web page (for example, a company portal site) for browsing only cannot be accessed.

SUMMARY OF THE INVENTION

The present invention has been made in light of the above problem, and manages use of an information processing apparatus by an external service while enabling access to the external service.

The present invention has the following configuration. According to an aspect of the present invention, there is provided an information processing apparatus comprising: a service request unit configured to be capable of requesting a service from a connected external server; a service provision unit configured to provide a service to outside in accordance with a request by the external server; and a holding unit configured to hold identification information of a service requester to which service provision by the service provision unit is permitted, and to be installable and uninstallable, wherein the service provision unit determines, with reference to the identification information held by the holding unit, whether or not service provision to the service requester is permitted, and in a case where it is determined that the service provision is permitted, provides the requested service, and the service request unit further obtains and displays display screen information with respect to the external server.

According to the present invention, use of an information processing apparatus by an external service can be managed based on a license associated with the information processing apparatus, without changing the external service.

Further features of the present invention will become apparent from the following description of exemplary embodiments with reference to the attached drawings.

BRIEF DESCRIPTION OF THE DRAWINGS

FIG. 1 is a diagram showing the configuration of a network system that includes an MFP, which is an example of an image processing apparatus according to a suitable embodiment of the present invention.

FIG. 2 is a block diagram showing an example of the apparatus configuration of the image processing apparatus (MFP).

FIGS. 4A and 4B are block diagrams showing an example of the software configuration of an image processing apparatus and a Web server according to a suitable embodiment of the present invention.

FIG. 5 is a sequence diagram of an image processing system according to a suitable embodiment of the present invention.

FIG. 6 is a basic flow of a service provider in a first embodiment of the present invention.

FIG. 7 is a basic flow in a service provider of a second embodiment of the present invention.

FIG. 10 is a flowchart of processing for installing an application according to a suitable embodiment of the present invention.

FIG. 16 is a diagram showing an example of a GUI displayed on an operation unit of an MFP according to the third embodiment of the present invention.

FIG. 17 is a flowchart showing an example of processing in the MFP according to the third embodiment of the present invention.

FIG. 18 is a diagram showing the configuration of an application and software modules of the MFP according to the third embodiment of the present invention.

DESCRIPTION OF THE EMBODIMENTS

Figure 3A:
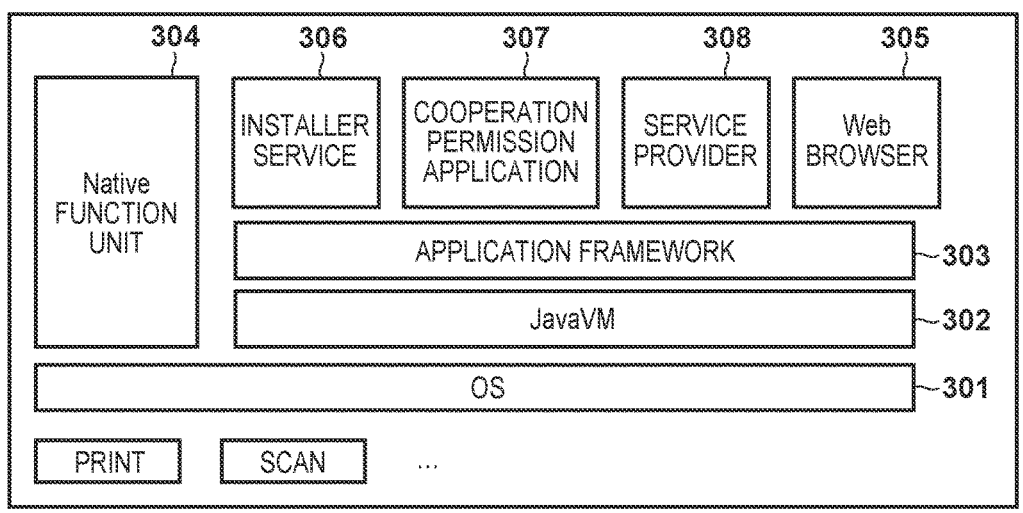
FIGS. 3A and 3B are block diagrams showing a software configuration according to a suitable embodiment of the present invention.

Embodiments for carrying out the invention will be described below with reference to the drawings. Note that the constituent elements described in the embodiments are only illustrative and it is not intended to limit the scope of the invention to these constituent elements.

First Embodiment

Example of System Configuration

FIG. 1 is a diagram showing the configuration of an image processing system that includes an image processing apparatus, which is an information processing apparatus (i.e., a computer) according to a suitable embodiment of the present invention. In FIG. 1, a Web server 100 is an information processing apparatus that provides an external service. This Web server 100 has a Web application 1001 as a service. Accordingly, it can be said that the Web server 100 is an application server that provides an application service. This application service is a service for extending the functions of an MFP 110, for example. The Web application 1001 sends content information to a Web browser, which will be described later, in accordance with an instruction from the Web browser. A license server 101 is an information processing apparatus for managing an application license. The license server 101 holds, in a storage (not illustrated), information regarding an application, a product key assigned to the application and a license file for activating the application. Furthermore, the license server 101 has a means for receiving a request for a license file from an information processing apparatus (not illustrated) via a network 120, and has a function for sending the license file to the requester in accordance with the request. A management apparatus 102 is an information processing apparatus that handles the management of the image processing system. The administrator of the image processing system performs setting and management of the MFP 110 and installation of applications, using the management apparatus 102.

The MFP (multi-function peripheral) 110 is an image forming apparatus or an image processing apparatus, and is a device in which various applications can be installed. In this embodiment, an image processing apparatus or an image forming apparatus is used, but any information processing apparatus in which various applications can operate can be the device in this embodiment. In this embodiment, in order to simplify the description, a multi-function peripheral (MFP) that has a plurality of functions such as a printer and an image scanner is used as an example of the device. In the following description, an MFP refers to an image processing apparatus in which an application is installed. The network 120 is a network such as the Internet. The MFP 110 is connected to the Web server 100, the management apparatus 102 and the information processing apparatus (not illustrated) via the network 120.

FIG. 2 is a block diagram showing an example of the apparatus configuration of the MFP 110. In FIG. 2, a control unit 208 includes a CPU 210, a ROM 211 and a RAM 212, and performs control of overall operations of the MFP 110. The CPU 210 reads out a control program stored in the ROM 211, and executes various types of control processing such as readout control and transmission control. The RAM 212 is used as a temporary storage area such as a main memory or a work area of the CPU 210. Also, the control unit 208 is connected to a function unit 201 and controls the operations of an operation display unit 202, a scanner unit 203 and a printer unit 204. The control unit 208 also executes installed application programs (referred to as device applications or simply as applications) such as a Web browser.

A display unit such as a liquid crystal display that has a touch panel function, a keyboard, and the like are arranged in the operation display unit 202. A screen of a Web browser and the like is displayed on the operation display unit 202. The printer unit 204 prints image data output from the control unit 208. The scanner unit 203 reads images on documents, generates image data, and outputs the image data to the control unit 208. An interface unit 206 connects the control unit 208 to the network 120 so as to receive image data to be printed from an external information processing apparatus (not illustrated) and to receive screen data to be displayed on the operation display unit 202. An HDD 209 stores image data and various programs. Note that the image data to be printed received from the external information processing apparatus is temporarily stored in an image memory 207, and is printed by the printer unit 204 via the control unit 208.

Software Configuration of MFP 110

FIG. 3A is a diagram showing an example of the software configuration of the MFP 110 in this embodiment. Each item of software shown in FIG. 3A is stored in the ROM 211 or the HDD 209, and is executed by the CPU 210.

Generally, a real time OS is used for an OS (Operation System) layer 301, but a general purpose OS such as a Linux (registered trademark) may also be used.

A Java VM 302 is a virtual machine such as a Java (registered trademark), and provides an application execution environment.

An application framework 303 provides a function for managing the life cycle of an application. A native function unit 304 provides functions incorporated in the MFP 110. A function for performing printing in the printer unit 204 based on printing data received via the interface unit 206 is an example of a Native function. Installed applications can use the native functions provided by the MFP 110. In the example in FIG. 3A, a Web browser 305, an installer service 306, a cooperation permission application 307 and a service provider 308 are installed as applications. The installed applications can be uninstalled as necessary.

The Web browser unit 305 (also referred to as the Web browser 305) causes a Web browser in the MFP 110 to function. The Web browser unit 305 can display information in the form of a hypertext on the operation display unit 202, and can transmit operation information input from the operation display unit 202 and the like to the Web server 100, for example. The Web browser unit 305 can also execute a script received from the Web server 100. Accordingly, the Web browser unit 305 analyzes an HTML file received from the Web server 100 or an information processing apparatus (not illustrated), and displays, on the operation display unit 202, an operation screen that is based on the description of the analyzed HTML file. Moreover, the Web browser unit 305 serves as a service requester that requests a service from the Web application 1001, with the Web application 1001 serving as a destination of a request for the service.

The installer service 306 performs installation processing by registering a plurality of applications in the application framework 303. A license file needs to be installed in the MFP 110 in order to enable an installed application. Unless the license file is not installed, the operation of the application is stopped by an application management function (not illustrated). The installer service 306 also performs installation of this license. License files are issued by the license server 101. Information for identifying a target application and information for identifying an MFP in which the application is to be installed are embedded in a license file. The information for identifying an MFP is the serial number of the MFP, for example. In order to install the same application in another MFP, a license file in which identification information regarding this MFP is embedded needs to be installed. This can prevent unauthorized copying of the software.

The cooperation permission application 307 is an application that is installed by the installer service 306, and provides various functions on the MFP 110. The cooperation permission application 307 can be downloaded from outside the MFP 110 and be installed. The cooperation permission application 307 can communicate with the user via the operation display unit 202. The cooperation permission application 307 can also generate image data via the native function unit 304 using the scanner unit 203.

The service provider 308 controls job execution instructed via the Web browser 305. For example, upon receiving a printing instruction via the Web browser 305, the service provider 308 can execute the print job by controlling the printer unit 204 via the native function unit 304. Accordingly, the service provider 308 is a service provider that provides the functions of the MFP 110 as services to outside the MFP 110, such as the Web application 1001, for example.

Note that in this embodiment, the Java VM 302, the application framework 303, the installer service 306, the Web browser 305, the cooperation permission application 307 and the service provider 308 are assumed to be stored in the HDD 209. The native function unit 304 is assumed to be stored in the ROM 211.

FIG. 4A is a block diagram showing an example of the software configuration of the image processing apparatus (MFP) and the Web server according to the first embodiment of the present invention. The function units shown in FIG. 4A are realized by the CPU 210 of the MFP 110 or a CPU (not illustrated) of the Web server 100 executing a control program. Note that the software configuration of the image processing system, and, in particular, the image processing apparatus, will be described below, but these functional blocks may be realized by hardware or a combination of hardware and software.

The Web browser 305, the service provider 308 and the cooperation permission application 307 are each realized by the CPU 210 of the MFP 110 executing a control program. Note that the Web browser 305 and the Web server 100 may be a client and a server that conform to another protocol as long as the protocol is shared and contents can be requested/provided. Accordingly, the Web browser 305 is not limited to a Web browser that displays the contents of the Web server 100. Similarly, the Web server 100 is not limited to a Web server that transmits/receives a request/response according to an HTTP protocol. Therefore, it suffices for the Web browser 305 to be a client that has a function for obtaining contents by communicating with a server, and displaying the contents on the screen. Here, contents refer to information regarding a display screen to be displayed on the operation display unit 202 by the MFP 110.

The Web browser 305 is provided with a communication unit 421, an analysis unit 422 and a screen display unit 423. The communication unit 421 performs communication with the presentation unit 411 in the Web application 1001 of the Web server 100 in accordance with the HTTP protocol. More specifically, the communication unit 421 transmits information that is input via an operation screen displayed by the Web browser 305 as a request to the Web application 1001. The communication unit 421 also receives a response (processing result) transmitted from the Web application 1001. The address (URL) of the Web application 1001, which is a partner to/from which the Web browser 305 transmits requests and receive responses, is held in the Web browser 305. The URL of the partner can be provided any time in response to a demand from an installed application or the service provider 308 to be described later.

The analysis unit 422 analyzes a response received from the Web application 1001. The response includes HTML data, which is description indicating the content of an operation screen to be displayed on the Web browser 305. The screen display unit 423 functions as a display control unit, and displays, on the operation display unit 202, a screen corresponding to HTML data, a script or the like, based on the result of analysis on the HTML data (display screen information) performed by the analysis unit 422.

The service provider 308 is provided with a communication unit 431, a job generation unit 432, a content generation unit 433 and a permitted URL validation unit 434. The communication unit 431 receives a processing request from a logic unit 412 in the Web application 1001. Also, in the case of receiving a request from the communication unit 421 of the MFP 110, the communication unit 431 returns content information (HTML data) generated by the content generation unit 433, which will be described later, as a response. The job generation unit 432 receives the processing request received by the communication unit 431, and generates and executes a job for executing the requested processing. In the case where the communication unit 431 receives a request from the communication unit 421 of the MFP 110, the content generation unit 433 generates content information (HTML data) used by the Web browser 305 to perform screen display. Also, the content generation unit 433 may reference and use contents stored in a storage apparatus such as the HDD 209 in advance, without dynamically generating contents. When the communication unit 431 receives a processing request, the permitted URL validation unit 434 determines whether or not the requester's URL matches a permitted URL to be described later. In the case where the URLs match, the permitted URL validation unit 434 permits the job generation unit 432 to generate a job. In the case where the URLs do not match, the permitted URL validation unit 434 does not permit the job generation unit 432 to generate a job.

The cooperation permission application 307 is an application installed in the MFP 110. The cooperation permission application 307 has been installed in the MFP 110 in order to manage job generation performed by the service provider 308. Information regarding a permitted URL 441, which is included in the cooperation permission application 307, is information that can be referenced from another application and the service provider 308, and is used as a criterion for the permitted URL validation unit 434 to determine whether or not to permit job generation. This may be called information for identifying a Web application that has an authority to use the resources of the MFP 110, and information regarding permission for the use thereof.

File Contents

Figure 8A:
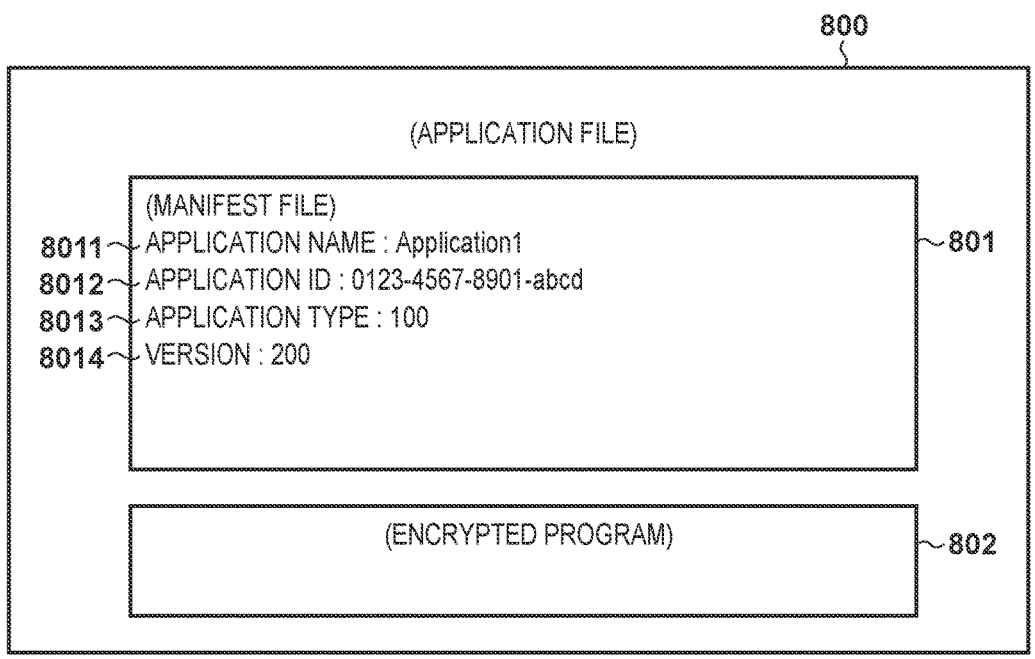
FIGS. 8A and 8B are diagrams showing an example of the structure of an application according to a suitable embodiment of the present invention.
Figure 8B:
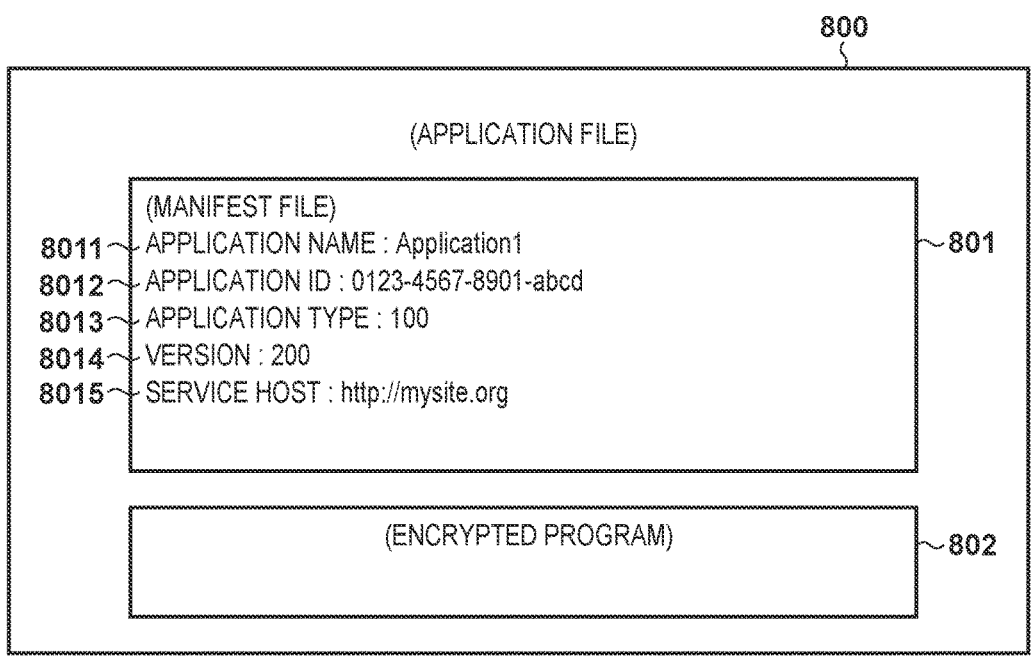

Next, an application file will be described with reference to FIGS. 8A and 8B. The application file refers to an application program file (which may be compressed) and a file including the metadata file of the application program. In FIGS. 8A and 8B, an application file 800 is constituted by one file obtained by compressing a plurality of files such as a CAB file, a JAR (Java (registered trademark) Archive) file and a ZIP file. The application file 800 contains a manifest file 801 and an application program 802. In the manifest file 801, application auxiliary information such as the application name, the application ID for uniquely identifying this application, and the version are written. The manifest file 801 is read by the installer service 306 at the time of installation. Information written in the manifest file 801 of the installed application can be referenced from another installed application and the service provider 308 via the application framework 303. The application program 802 in the application file 800 is encrypted in order to prevent program alteration by a third party and the like. The application program 802 is distributed to users via recording media such as CDs or media such as the Internet, and is deciphered and executed by MFPs, in which the application is installed. The application program 802 is decrypted, and is then installed on the application framework 303.

In this embodiment, items for description in the manifest file 801 are defined as follows:

the application name 8011 indicates the name of the application, an application ID 8012 indicates an identifier for uniquely specifying the application, an application type 8013 indicates a type of application (for example, the value of 100 indicates an application used for permitting use (cooperation) of the MFP from an external service, that is, the cooperation permission application 307 in this embodiment), a version 8014 indicates the version of the application, and a service host 8015 indicates, in a URL format, the address of the server that provides the service. Regarding the cooperation permission application 307, the address written under this item is the permitted URL 441. Specifically, the service whose address is indicated in this item is permitted to use the MFP in which this cooperation permission application 307 has been installed. This item is set by the application developer at the time of the preparation of the application.

Figure 9A:
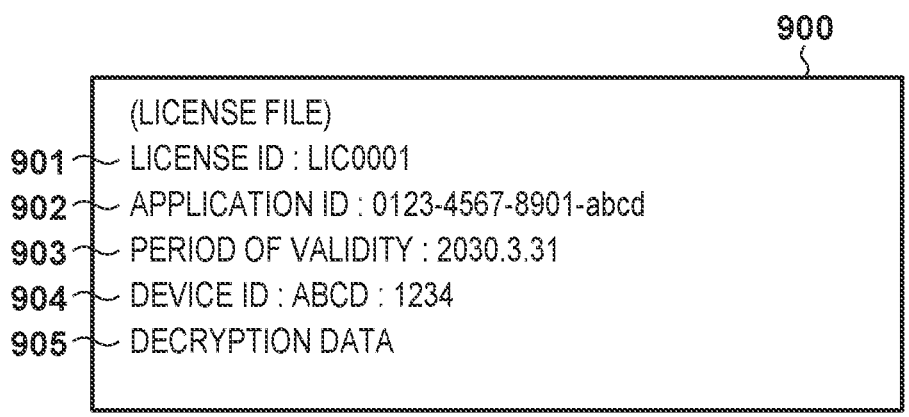
FIGS. 9A and 9B are diagrams showing an example of a license file according to a suitable embodiment of the present invention.

FIG. 9A is a diagram showing an example of a license file that is installed in the MFP 110 in order to enable an application. In this embodiment, items for description in the license file are defined as follows:

In FIG. 9A, a license ID 901 indicates a unique ID for identifying the license. The types of license include a trial license in which the number of times of startup and a period are restricted, a restriction license in which a function of simultaneous startup and the like is restricted, a license without any restrictions, and the like.

In FIG. 9A, an application ID 902 indicates an application ID that uniquely identifies an application in which the license is to be set. In FIG. 9A, a period of validity 903 indicates a period during which the application in which this license is to be set can be used. In FIG. 9A, a device ID 904 indicates a device ID for uniquely identifying an MFP in which the application in which this license is to be set can be installed. In FIG. 9A, a decryption data 905 indicates stored information for decrypting the encrypted application program 802 of the application, in which the license is to be set. The installer service 306 determines, based on information written in the license file, whether the application is enabled or disabled. When the following conditions are all satisfied, the license of the application is assumed to be enabled:

the application ID 902 written in the license file matches the application ID 8012 written in the manifest file of the target application, the period of validity 903 written in the license file has not expired, and the device ID 904 written in the license file matches the device ID obtained from the MFP in which installation is to be performed.

Application Installation Processing

Next, an example of application installation processing in this embodiment will be described with reference to FIG. 10. The installation program of an application to be installed and various setting values required for the installation are assumed to have been given to the management apparatus 102 by the administrator. Applications that are installed by this procedure include the service provider 308, the Web browser 305 and the cooperation permission application 307.

In step S1000, the management apparatus 102 obtains device identification information from the MFP 110. The device identification information is information for uniquely identifying an image processing apparatus. The device identification information is a serial number, for example.

Next, in step S1001, the management apparatus 102 sends application identification information and the device identification information to the license server 101. The application identification information is an application ID, an application name, a version or the like.

Next, in step S1002, the license server 101 transmits a license file to the management apparatus 102 based on a predetermined method. The license server sets the application identification information and the device identification information received in step S1001 respectively as the application ID 902 and the device ID 904 in FIG. 9A, and generates a license file. The generated license file is sent to the management apparatus 102.

Next, in step S1003, the management apparatus 102 sends the installation program of the application and the license file obtained in step S1002 to the installer service 306 of the MFP 110.

Next, in step S1004, installation is performed in the MFP 110. Specifically, the installer service 306 of the MFP 110 starts the installation program received in step S1003, and registers the application file in the application framework 303.

Next, in step S1005, the MFP 110 activates (enables) the installed application. Specifically, the installer service 306 of the MFP 110 compares information written in the license file obtained in step S1003, device information of the MFP 110 and information regarding the application installed in step S1004. For example, if the value of the device ID 904 written in the license file obtained in step S1003 and the device ID obtained from the MFP 110 are different from each other, installation is regarded as being unauthorized, and activation is considered to have failed. If activation fails, the application registered in the application framework 303 cannot be started. Similarly, if the application ID 902 written in the license file obtained in step S1003 and the application ID of the application installed in step S1004 are different from each other, activation is considered to have failed as well.

If activation is successful in step S1005, the MFP 110 returns "activation success" to the management apparatus 102 in step S1006. For example, information indicating that activation has been successful is sent to a Web browser (not illustrated) of the management apparatus 102, and thereby the Web browser (not illustrated) of the management apparatus 102 notifies the management apparatus 102 that installation has been successful.

If activation is not successful in step S1005, the MFP 110 returns "activation failure" to the management apparatus 102 in step S1007. For example, information indicating that activation has failed is sent to a Web browser (not illustrated) of the management apparatus 102, and thereby the user is notified that installation has failed.

A Web browser usually receives a response to an HTTP request. In view of this, a configuration may be adopted in which, in the case of using the Web browser of the management apparatus 102, the management apparatus 102 transmits, to the MFP 110, a request for a URL indicating whether installation has been successful or has failed, immediately after step S1003, for example, and "installation failure/success" is returned to the management apparatus 102 in response to the request. A configuration may also be adopted in which a script is transmitted to the management apparatus 102, and "installation failure/success" is received using the script. Of course, the installation result may be notified without using the HTTP.

Moreover, in the case of permitting the Web application 1001 to use a device application such as the service provider 308, the cooperation permission application 307 whose the manifest file 801 includes a URL for allowing the Web browser 305 to access the Web application 1001 needs to be registered. One cooperation permission application 307 may be installed for each Web application that uses the device application, or the URLs of one or more Web applications that use the device application may be written in the manifest file of one cooperation permission application 307.

Procedure in Image Processing Apparatus

Next, a series of processing in the image processing apparatus in this embodiment will be described with reference to FIG. 5. This sequence is started by the Web browser 305 of the MFP 110 being started by the user. Note that it is the Web server 100 that exchanges an HTTP request/response with the Web browser 305, and the Web application 1001 exchanges a request/response with the Web browser 305 via the Web server 100. However, in FIG. 5, description and explanation is given as if the Web browser 305 directly communicates with the Web application 1001, omitting the mediation of the Web server 100. First, in step S500, the Web browser 305 gives an HTTP request to the Web application 1001 of the Web server 100. At this time, the destination of the HTTP request is a URL for Web application specified for each Web application 1001. In step S501, the Web application 1001 that received the request returns HTML contents (display screen information) of a screen to be displayed on the Web browser 305 as an HTTP response. For example, in the case where the HTTP request is a request for a print setting screen, the Web application 1001 sends an HTML response for scanning setting screen display.

If the user performs an operation on the contents displayed on the operation display unit 202 using the Web browser 305, the Web browser 305 transmits an HTTP request for execution of a function of the service provider 308, to the Web application 1001 in accordance with the operation in step S502. Here, for example, if the user pressed a scanning execution button as the operation on the contents, the Web browser 305 transmits an HTTP request for scanning execution to the URL for Web application serving as a destination. The Web application 1001 determines, based on the request, that scanning execution has been requested by the Web browser 305. The request may include information indicating the address of the service provider 308 of the MFP in which the requested function is executed.

In step S503, the Web application 1001 sends HTML contents for screen display as a response to the Web browser 305. Here, the contents sent as a response are HTML contents for notifying the user that the processing is being performed.

In step S504, the Web application 1001 gives an instruction for function execution to the service provider 308. For example, in the case where an instruction for scanning execution is given by the user in step S502, the instruction for scanning is given to the service provider 308. Transmission of this instruction for function execution is performed between the logic unit 412 and the service provider 308, and thus the instruction does not have to be in the HTTP format. Alternatively, a configuration may be adopted in which the service provider 308 has a Web server function, and an instruction is transmitted as a HTTP request. In addition, the Web application 1001 provides an application service in accordance with a request by the MFP 110, and thus in the case where the Web application 1001 requires a service from the MFP, the service is requested from the MFP, which is the requester of the application service. Specifically, the MFP that makes a request for the service to the Web application 1001 serves as an MFP that is a request destination of a service by the Web application 1001.

In step S505, the service provider 308 obtains a connection URL from the Web browser 305. Specifically, the service provider 308 obtains the URL of the Web application 1001 that transmitted the response in the preceding step S503.

Next, in step S506, the service provider 308 obtains a permitted URL held by the cooperation permission application 307.

Next, in step S507, the service provider 308 determines whether or not the URLs obtained in step S505 and step S506 match.

If it is determined in step S507 that the URLs match, the service provider 308 executes the job in step S508. For example, in the case where an instruction for scanning execution is given by the user in step S502, a scanning job is generated, and scanning is executed. Image data generated by scanning is transmitted to the Web application 1001, or is stored in a storage of the MFP 110, for example, in accordance with a job execution request.

If it is not determined in step S507 that the URLs match, the service provider 308 notifies the Web application 1001 of an error in step S509. For example, error code information indicating license violation is notified by a predetermined method.

In the above example, scanning is used as the function, but the above-described procedure can be applied to any function provided to the Web application 1001 via the service provider 308.

Processing Procedure by Service Provider

Next, the basic flow of the service provider 308 will be described with reference to FIG. 6. Note that the processing to be described below is realized by the CPU 210 executing a program read out from a storage apparatus such as the HDD 209.

In step S601, the service provider 308 receives an instruction for job execution from the Web application 1001 (corresponding to step S504 in FIG. 5). It is assumed that detailed information regarding the job has been sent from the Web application to the service provider 308 as appropriate.

Next, in step S602, the service provider 308 obtains a destination URL from the Web browser 305. This step corresponds to step S505 in FIG. 5.

Next, in step S603, the service provider 308 obtains a permitted URL from the cooperation permission application 307. This step corresponds to step S506 in FIG. 5.

In step S604, the service provider 308 determines whether or not those URLs match. Specifically, in the case where the two URLs obtained in steps S602 and S603 are the same, it is determined that the URLs match. This step corresponds to step S507 in FIG. 5.

If it is determined in step S604 that the URLs match, the service provider 308 executes the job in step S605. Specifically, the service provider 308 executes the job instructed from the Web application 1001 in step S601. This step corresponds to step S508 in FIG. 5.

If it is determined in step S604 that the URLs do not match, the service provider 308 notifies the Web application 1001 of an error in step S606. Specifically, the Web application 1001, which is the sender of the instruction for job execution received in step S601, is notified of error information using a predetermined method. This step corresponds to step S509 in FIG. 5.

As described above, in the image processing system in the first embodiment, use of the image processing apparatus from a Web application can be easily managed. Accordingly, in the case where an instruction for job execution is given from a Web application to the image processing apparatus, the job can be executed only if a cooperation permission application that has the URL of that Web application has been installed. When it is desired to permit a specific Web application to use the image processing apparatus, such use can be permitted by installing a cooperation permission application that has the URL of that Web application. In addition, when it is desired to change the state from permission for use to non-permission for use, the change is possible by uninstalling a relevant application that has been installed. Particular change is not added to the Web browser, the Web application and the Web server, and thus communication from the image processing apparatus to the Web application, and communication from the Web application that does not involve use of the image processing apparatus are not restricted.

The above configuration is not limited to job execution. In the case of using the resources of the image processing apparatus from a Web application, a cooperation permission application that includes identification information (e.g., a URL) for a Web application permitted to use the resources of the image processing apparatus is installed in the image processing apparatus. A service provider can determine whether or not the Web application has the authority to access the resources of the image processing apparatus, by referencing the identification information held by the cooperation permission application. In addition, scanning was described as an example of a service, but a printer function which can be provided by the MFP 110, functions of both a scanner and a printer, functions of a facsimile, a data storage box and the like can also be provided.

Second Embodiment

Every time the number of Web applications that use the image processing apparatus increases, a cooperation permission application needs to be installed, thereby increasing the management man-hours of the administrator. Improvement of granting a particular authority to the image processing system, and, without a cooperation permission application, permitting use of the image processing apparatus from a Web application in a system that includes this particular authority is conceivable. In order to simplify the description, only differences from the first embodiment will be described. Those differences will be described with reference to FIGS. 4B, 7 and 9B.

Figure 9B:
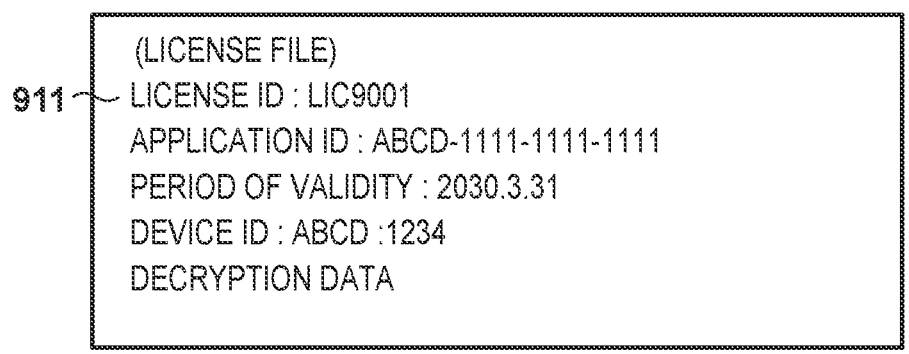

An example will be described in which a particular authority is granted by a license file of the Web browser 305. Using the license ID of the license file installed along with the Web browser 305, an authority to be given to the image processing system can be specified. FIG. 9B is an example of a license file of the Web browser 305 that has a particular authority. A value indicating a particular authority is set as a license ID 911. The image processing apparatus 110 in which the Web browser 305 has been installed along with the license file indicating this particular authority is assumed to have the particular authority. According to the particular authority, there is no limit to the Web application 1001 that uses the image processing apparatus 110. In other words, regarding an application that has this particular authority, and, in particular, the Web application 1001 that provides a service in accordance with a request from the Web browser 305, any Web application can use the image processing apparatus 110, and the cooperation permission application 307 does not need to be installed for such use.

Example of Software Configuration

FIG. 4B is a block diagram showing an example of the software configuration of an image processing apparatus (MFP) and a Web server in a second embodiment of the present invention.

When the communication unit 431 receives a processing request from the Web application 1001, the license validation unit 435 determines whether or not the license of the Web browser 305 grants a particular authority that allows use of the image processing apparatus 110 from the Web application 1001. In the case where there is a particular authority, the job generation unit 432 is permitted to generate a job. In the case where there is no particular authority, the permitted URL validation unit 434 determines whether or not to permit job generation. This is as described in the first embodiment. The license of the Web browser 305 can be referenced from another installed application or the service provider 308 via an application framework.

Basic Flow of Service Provider

FIG. 7 shows a basic flow in the service provider 308 in the second embodiment. Steps S702 to S707 are the same as steps S601 to S606 in the flow in FIG. 6.

In step S701, the service provider 308 receives a job execution instruction from the Web application 1001. Note that the procedure in FIG. 7 may be started upon receiving a job execution instruction. This applies to the procedure in FIG. 6.

The service provider 308 determines in step S701 whether or not there is a particular authority. Specifically, the service provider 308 checks the license ID 911 of the license file of the Web browser 305 and in the case where a value indicating a particular authority is set, determines that there is a particular authority.

If it is determined in step S701 that the Web browser 305 has a particular authority, the service provider 308 executes the job instructed from the Web application 1001, in step S706.

If it is not determined in step S701 that there is a particular authority, the processing of steps S602 to S606 in FIG. 6 is executed. In this manner, in this embodiment, a particular authority is preferentially determined in step S701 before cooperation permission determination described in the first embodiment, and if there is a particular authority, the service is permitted to be provided.

In order to simplify the description, description was given in which determination using a license file as means for determine whether or not the image processing system has a particular authority, but there is no limitation thereon. The determination may be performed using the product name and the version of a Web browser. Also, the license of an application that has a function other than that of a Web browser may be a criterion for determining whether or not there is a particular authority.

As described above, in the image processing system in the second embodiment, it is possible to permit use of the image processing apparatus from a Web application without installing a cooperation permission application. Therefore, in the image processing system that has a particular authority, there is no need to install a cooperation permission application for each Web application, and thus the application management load of the administrator is diminished.

Third Embodiment

In the first embodiment, it is necessary to give a HTTP request to a URL for Web application specified for each Web application 1001 in step S500 in order to connect to the Web application. However, whether or not the URL for Web application that is to be connected is permitted for cooperation (whether or not a cooperation permission application corresponding to the URL for Web application has been installed) is not known until processing up to step S507 in the sequence in FIG. 5 is performed. Additionally, the user needs to know a Web application URL specified for each Web application 1001 in advance. In view of this, in this embodiment, improvement of adding, to a cooperation permission application, a function for connecting to a Web application is added to the configuration described in the first or second embodiment. Also in this embodiment, the system configuration and the hardware configuration of the MFP are respectively shown as in FIGS. 1 and 2, and are similar to that of the first embodiment, and thus the description thereof is omitted.

Figure 3B:
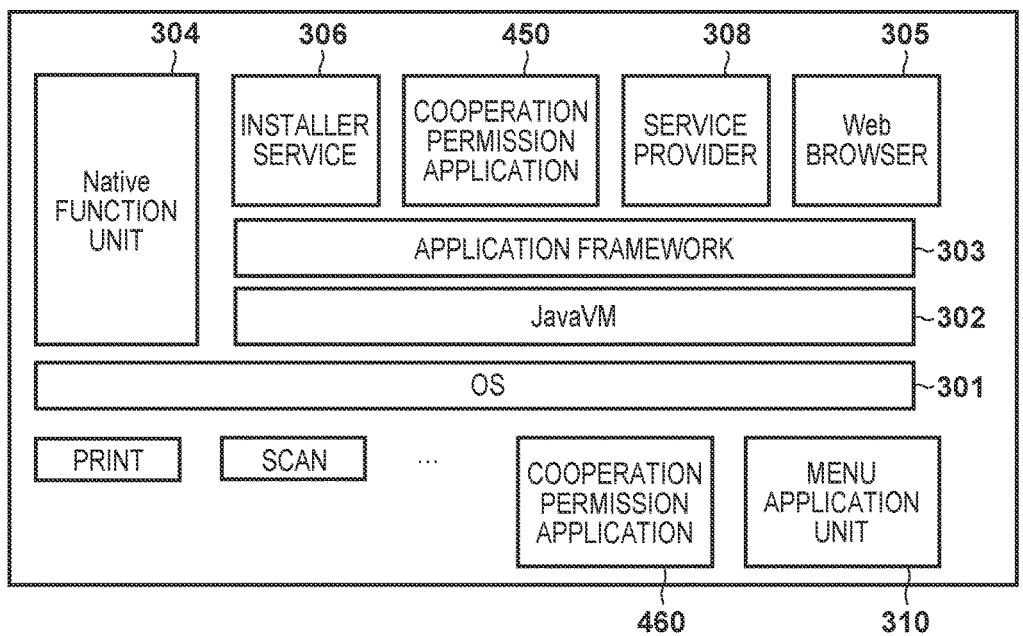

FIG. 3B is a diagram showing an example of the software configuration of the MFP 110 in this embodiment, similarly to FIG. 3A. FIG. 3B is different from FIG. 3A in that there are a plurality of cooperation permission applications 450 and 460, and there is a menu application 310. Note that in the following description, the cooperation permission application 450 will be described, but the same applies to the cooperation permission application 460 or other cooperation permission applications.

Example of Software Configuration of MFP and Web Server

Figure 4C:
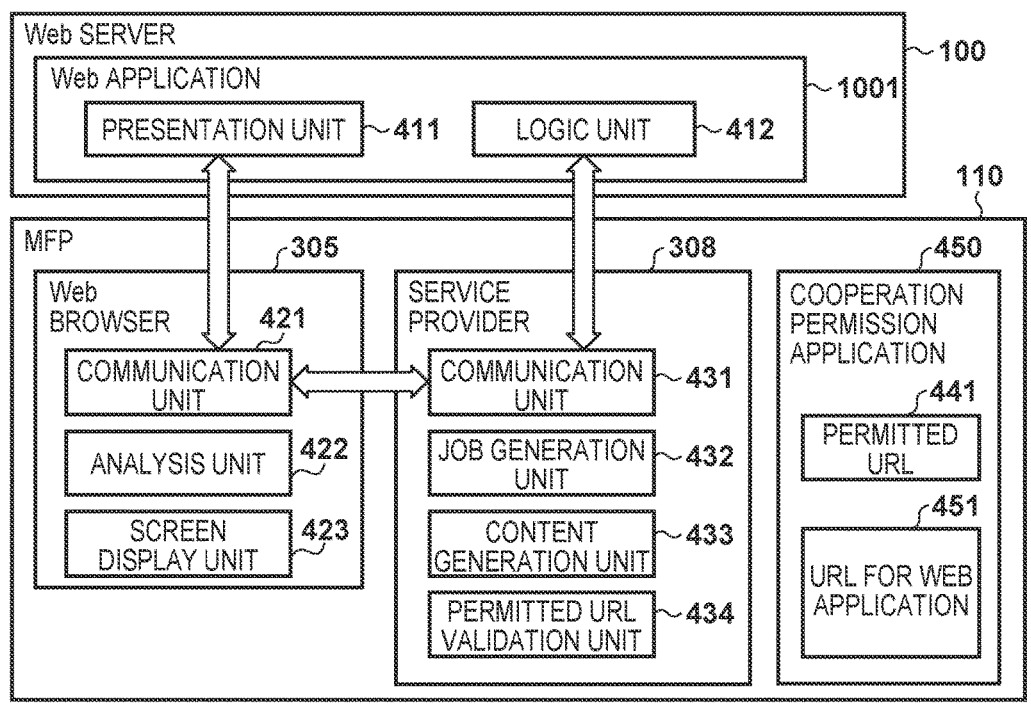
FIG. 4C is a block diagram showing an example of the software configuration of an image processing apparatus and a Web server according to a suitable embodiment of the present invention.

FIG. 4C is a block diagram showing an example of the software configuration of an image processing apparatus (MFP) and a Web server in the third embodiment of the present invention. Note that, unless particularly stated otherwise, the constituent elements and blocks have the same roles as those in FIGS. 4A and 4B above. FIG. 4C is different from FIGS. 4A and 4B above in that a plurality of Web application URLs can be held in a cooperation permission application. The cooperation permission application 450 in FIG. 4C holds two URLs, namely, the permitted URL 441 and a URL for Web application 451. The permitted URL 441 is a URL used for checking whether or not the Web application is permitted for cooperation, in other words, permitted to access the resources of the MFP 110 as described in the first embodiment. The URL 451 for Web application is the URL of the top page (hereinafter, referred to as a top page URL) of a Web application, namely, the entry point of a Web application. Also, there are cases where the top page URL is used to check whether or not the Web application is permitted for cooperation, similarly to the permitted URL 441. Out of the two URLs, the URL 451 for Web application is essential. In the case where the domain and path of a URL for Web application and a permitted URL are the same, the permitted URL 441 can be omitted. In other words, in the case where only the URL 451 for Web application is included, it can be determined that the URL 451 for Web application is also a permitted URL. On the other hand, in the case where the domain and path of a URL for Web application and a permitted URL are different, the permitted URL cannot be omitted. For example, in the case where a top page is provided using a subdomain (e.g., auth.mysite.org) for authentication or a Web application is provided using a dedicated subdomain (e.g., app1.mysite.org), both the URL for Web application (i.e., a top page URL) and the permitted URL need to be specified.

Software of Cooperation Permission Application 450

FIG. 18 is a diagram showing the configuration of a software module of the cooperation permission application 450 according to the embodiment. Here as well, description is focused on the cooperation permission application 450, but the same applies to other cooperation permission applications. The cooperation permission application 450 holds, in a manifest file 1801, setting information required for each Web application. In other words, one cooperation permission application is required for one Web application. A cooperation permission application corresponding to a Web application to be used is installed in the MFP 110. In the case of using a plurality of Web applications, a plurality of cooperation permission applications are installed in the MFP 110. In that case, the plurality of cooperation permission applications will share and use one Web browser 305. These software modules shown in FIG. 18 are stored in the HDD 209 of the MFP 110, and at the time of execution, are loaded to the RAM 212 and executed by the CPU 210.

The manifest file 1801 is a file in which basic information regarding the cooperation permission application 450 and information for connecting to a Web application are written. The permitted URL 441 and the URL 451 for Web application are registered in this manifest file 1801. A top page URL 8016 of the Web application (see FIG. 11A) registered in the manifest file 1801 is transmitted from the menu application cooperation unit 1811 to the Web browser cooperation unit 1812, such that the application that operates in the Web browser 305 can start operating. Note that the top page URL 8016 corresponds to the URL 451 for Web application. In addition, the service host 8015 corresponds to the permitted URL 441.

Figure 11A:
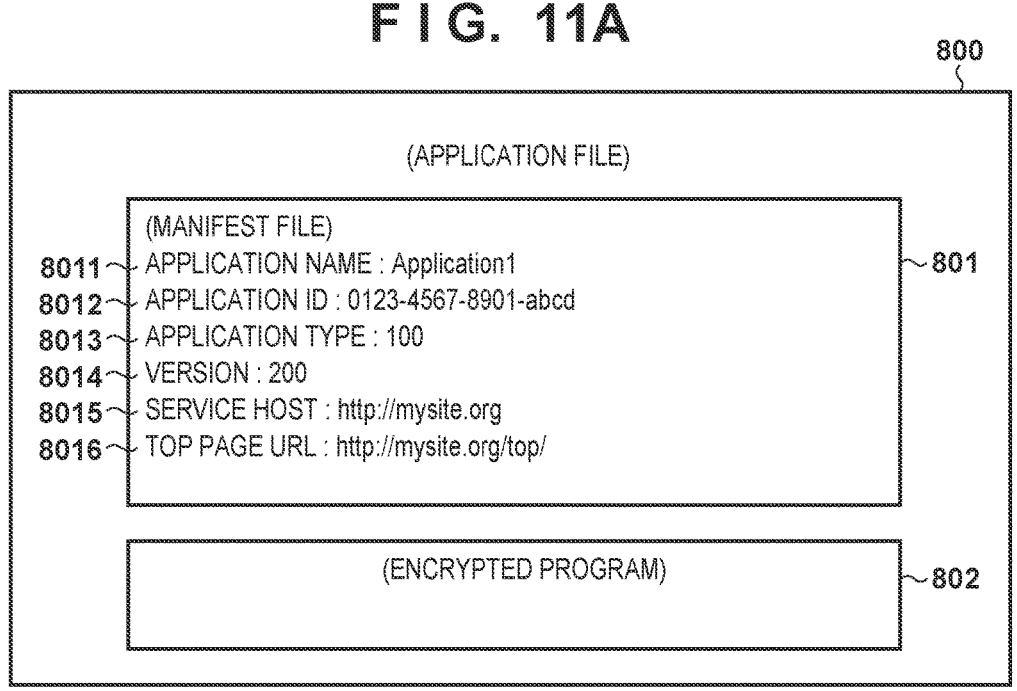
FIGS. 11A and 11B are diagrams showing an example of the structure of an application according to a third embodiment of the present invention.
Figure 11B:
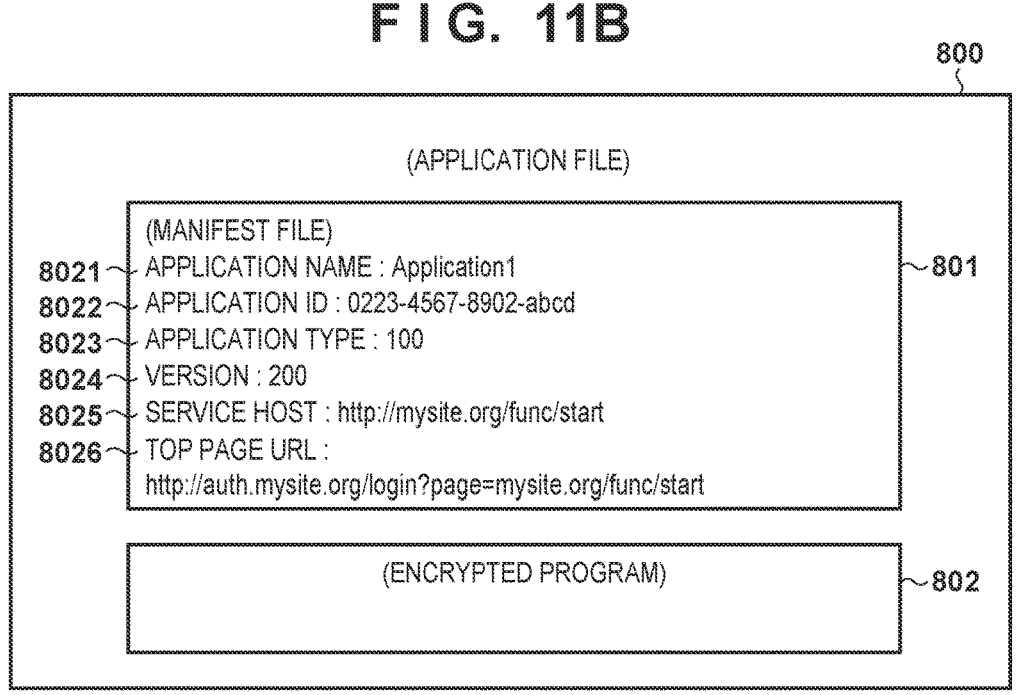

The application file 800 of a cooperation permission application will be described with reference to FIGS. 11A and 11B. FIGS. 11A and 11B are diagrams obtained respectively by changing a portion of FIGS. 8A and 8B. The manifest files 801 and 802 included in the application file 800 correspond to the manifest file 1801 shown in FIG. 18. Note that in this description, the differences from FIGS. 8A and 8B will be described. FIG. 11A shows an example in which the service host (i.e., permitted URL) 8015 and the top page URL (i.e., URL for Web application) 8016 are arranged on the same site. For example, a case is envisioned in which (the top page URL of) a site for storing a scanned document and a site (service host) for performing processing (e.g., file format conversion processing, image resolution conversion processing and the like) on the document are the same site. Note that in the case of this example, the service host 8015 and the top page URL 8016 are on the same site, and thus the service host 8015 can be omitted. In FIG. 11A, the top page URL 8016 indicates, in a URL format, the address of the top page of the Web application of a server that provides a service. Regarding the cooperation permission application 450 in FIG. 4C, the address written under this item is the URL 451 for Web application. In contrast, FIG. 11B shows an example in which the service host 8025 and the top page URL 8026 are arranged on different sites. For example, a case is envisioned in which authentication is performed on the site of the top page URL 8026, and subsequently, the service host 8025 continues the processing on another site. Note that in this example, the service host 8015 and the top page URL 8016 are arranged on different sites, and thus the service host 8015 cannot be omitted.

Processing for Installing Cooperation Permission Application

A flow of steps S1004 and S1005 in FIG. 10 when installing a cooperation permission application and when registering a button on a main menu as activation means will be additionally described with reference to FIG. 15.

Figure 15:
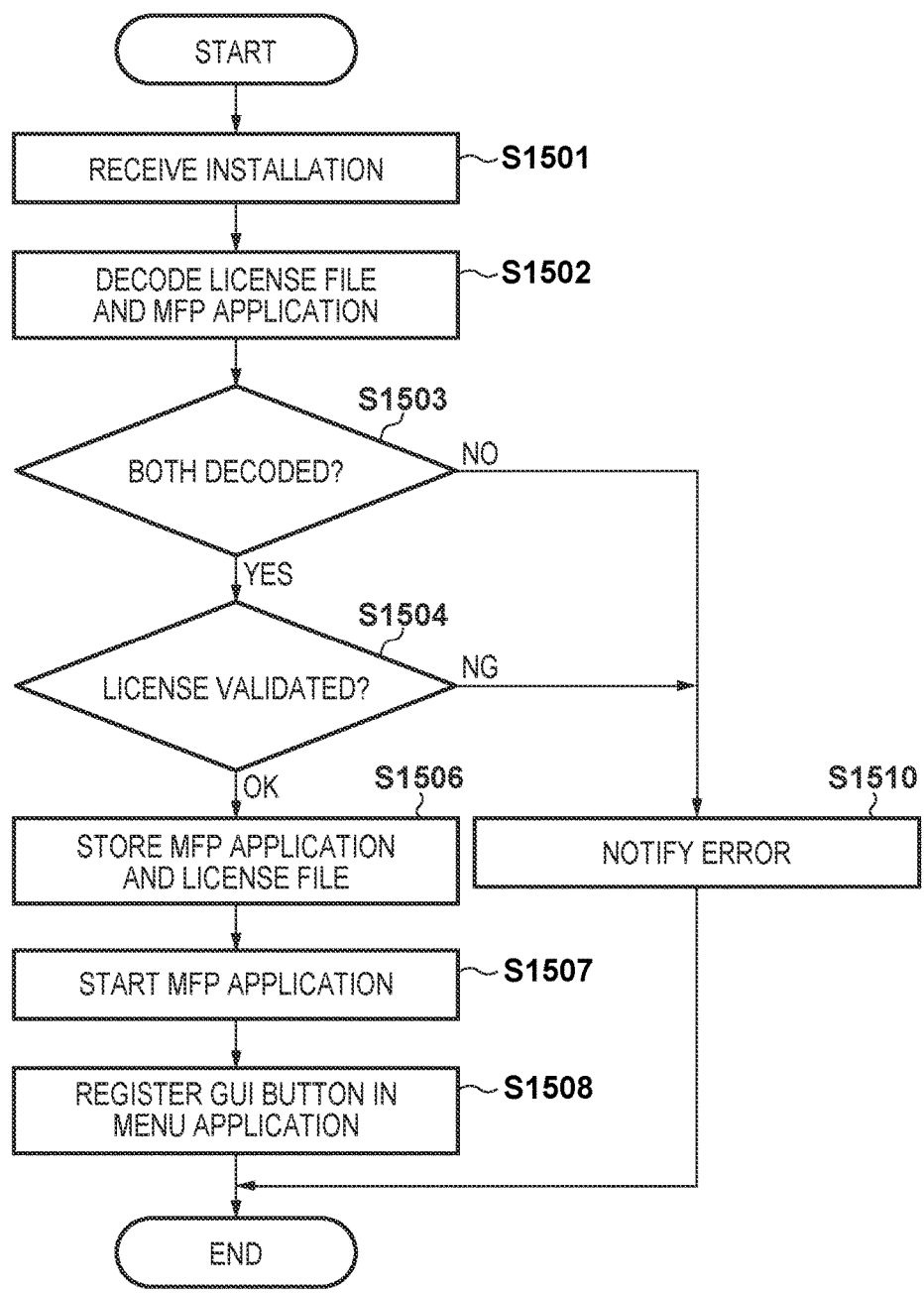
FIG. 15 is a basic flow of a service provider in the third embodiment of the present invention.

FIG. 15 is a flowchart illustrating the processing for installing a cooperation permission application performed by the MFP 110. Each of the steps in the flowchart in FIG. 15 is executed by the CPU 210 loading a program stored in the HDD 209 of the MFP 110 to the RAM 212, and analyzing and executing the program.

It is assumed that, as preparations in advance, a purchaser of a cooperation permission application has received an encrypted cooperation permission application and license access number, as described above, from a seller of the cooperation permission application, and has received a license file from the license server 101.

First, the installer service 306 receives, from a PC 140 operated by the purchaser of the cooperation permission application, the encrypted cooperation permission application and the encrypted license file, as an instruction for installation (step S1501). The installer service 306 decrypts the received cooperation permission application and license file (step S1502).

The installer service 306 checks whether not both the license file and the cooperation permission application have been decrypted (step S1503). In the case where both have been decrypted, the installer service 306 advances the procedure to step S1504. In the case where one of or both the license file and the cooperation permission application could not be decrypted, the installer service 306 notifies an error (step S1510) and ends the processing.

In step S1504, the installer service 306 compares a device ID written in the decrypted license file and a device ID set in the MFP 110 in advance, and determines whether or not the license file is a correct license file adapted for the MFP 110. If it is determined that the license file is a correct license file, the installer service 306 advances the procedure to step S1506. If it is determined that the license file is not a correct license file, the installer service 306 notifies an error (step S1510) and ends the processing.

Next, the installer service 306 saves the decrypted cooperation permission application and license file in the HDD 209. Subsequently, the installer service 306 loads the cooperation permission application saved in the HDD 209 to the RAM 212, and starts the cooperation permission application (step S1507). The started cooperation permission application registers, in the menu application 310, a GUI button (or an icon) for calling the cooperation permission application (step S1508).

FIG. 16 is a diagram showing an example of a GUI displayed on the operation display unit 202 when the menu application 310 of the MFP 110 is called out in a state where two cooperation permission applications are installed in the MFP 110 according to the embodiment. GUI buttons 1601, 1602 and 1603 are GUI buttons for calling the applications that are provided in the MFP 110 from the beginning. GUI buttons 1604 and 1605 are both GUI buttons for calling the cooperation permission applications. As shown in FIG. 16, a GUI button is displayed for each cooperation permission application. The GUI button 1606 is a GUI button for calling an application that operates on an MFP and that is other than a cooperation permission application. As shown in FIG. 16, the menu application 310 displays GUI buttons without distinguishing the types of applications.

Use Sequence of Web Application by MFP

Figure 13:
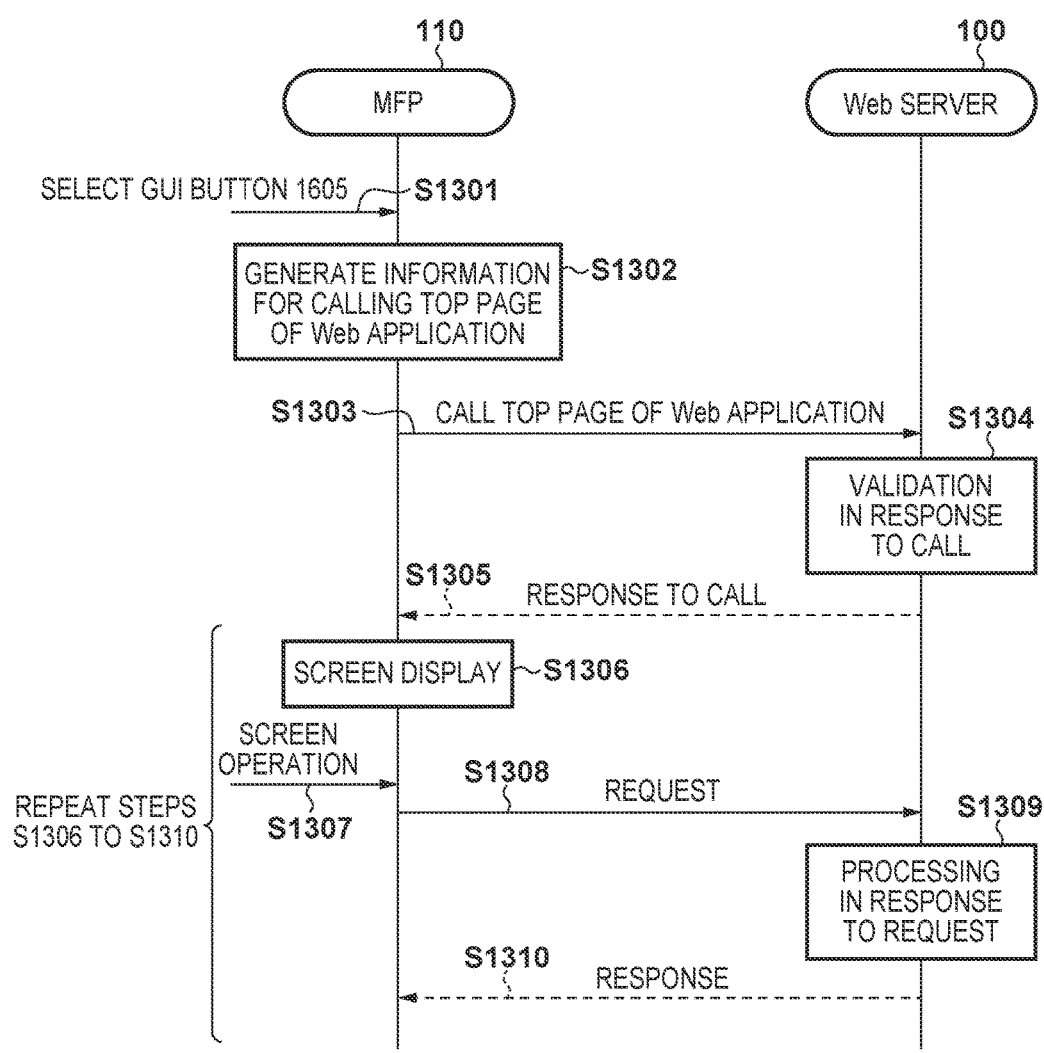
FIG. 13 is a sequence diagram of the image processing system according to the third embodiment of the present invention.

FIG. 13 is a sequence diagram showing a flow of a series of processing when a Web application is used from the MFP 110. Here, processing in the case where the GUI button 1605 displayed by the menu application 310 is selected by the user will be described as an example.

First, upon receiving pressing of the GUI button 1605 by the user, the menu application 310 of the MFP 110 calls the cooperation permission application 450 corresponding to the GUI button 1605 (step S1301). The called cooperation permission application 450 generates information necessary for calling the top page of the Web application based on information (for example, the top page URL 8016) defined in the manifest file 1801 of the cooperation permission application 450 (step S1302). Subsequently, the cooperation permission application 450 calls the top page of the Web application based on the information generated in step S1302 using the Web browser 305 (step S1303).

Upon receiving the call, the Web server 100 performs validation in response to the call (step S1304). As validation in response to the call, for example, it is checked whether or not the called URL is a URL that exists, or a browser version check or the like is performed. In consideration of the validation result, the Web server 100 returns, to the MFP 110 (Web browser 305), a response to the call (step S1305). If the validation result is OK (i.e., successful), the Web server 100 sends HTML contents for configuring a screen required for the next operation as a response. On the other hand, in the case where the validation has failed, a message to this effect is sent as a response.

The Web browser 305 renders the received HTML contents (or a failure message), and displays a screen on the operation display unit 202 (step S1306). In the case where the validation has been successful, upon subsequently receiving a screen operation instruction of the user (step S1307), the Web browser 305 transmits a request corresponding thereto to the Web server 100 using the HTTP protocol (step S1308).

The Web server 100 that has received the request performs processing in response to the request (step S1309), and sends, to the MFP 110 (Web browser 305), HTML contents for constituting the next screen based on the processing result as a response (step S1310). After that, Web application processing and screen transition are realized by repeating steps S1306 to S1310.

Figure 12:
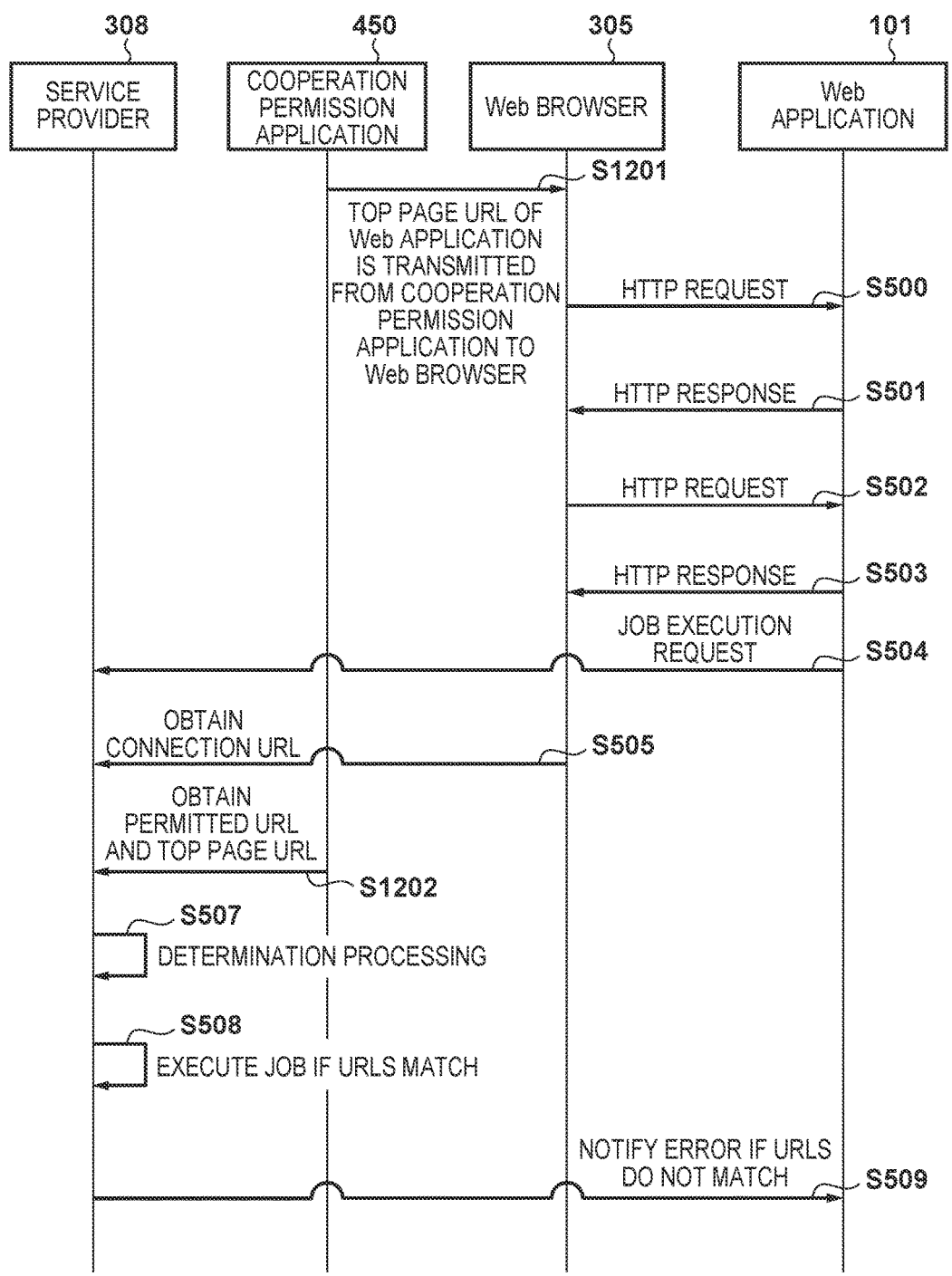
FIG. 12 is a sequence diagram of an image processing system according to the third embodiment of the present invention.

A series of processing in the image processing apparatus in this embodiment will be described with reference to FIG. 12. In this figure, a portion of the sequence in FIG. 5 is changed in accordance with this embodiment. Therefore, in this description, only differences will be described. Note that FIG. 12 is a diagram showing the sequence in FIG. 13 as the operations of the software modules, and illustrating, in detail, the case where the resources of the MFP 110 are used from the Web application 1001. In step S1201, a top page URL is transmitted from the cooperation permission application 450 to the Web browser 305. Description on the top page URL was given above with reference to FIG. 4C, and is thus omitted here. The service provider 308 that received a job execution request in step S504 obtains, in step S1202, the permitted URL 441 held by the cooperation permission application 450 and the URL 451 for Web application as the top page URL. In the case where a permitted URL could be obtained, the service provider 308 compares the permitted URL with the destination URL obtained in step S505 and if the URLs match, executes the requested job. On the other hand, in the case where the obtained URL does not include the permitted URL 441, the URL 451 for Web application and the destination URL obtained in step S505 are compared. If the URLs match, the requested job is executed. If the URLs do not match, the Web application 1001 is notified of an error.

Processing for Calling Top Page Using Cooperation Permission Application

FIG. 17 is a flowchart for describing the processing when a cooperation permission application calls the top page of a Web application. Each step of the flowchart in FIG. 17 is executed by the CPU 210 loading a program stored in the HDD 209 of the MFP 110 to the RAM 212, and analyzing and executing the program.

The flowchart in FIG. 17 illustrates the processing of steps S1301 to S1303 in FIG. 13 in detail. Step S1301 in FIG. 13 corresponds to step S1701 in FIG. 17. Step S1302 in FIG. 13 corresponds to steps S1702 to S1705 in FIG. 17. Step S1303 in FIG. 13 corresponds to step S1706 in FIG. 17.

In FIG. 17, the menu application cooperation unit 1811 of the cooperation permission application 450 receives a call instruction from the menu application 310 that received a pressing operation on a GUI button by the user (step S1701). Next, the Web browser cooperation unit 1812 obtains, from the manifest file 1801, the top page URL 8016 (see FIG. 11A), which is information regarding the Web application (step S1702).

Next, the Web browser cooperation unit 1812 sets the obtained top page URL as a connecting destination in the Web browser 305 (step S1704). The Web browser cooperation unit 1812 switches display on the operation display unit 202 from the menu application 310 to a GUI window of the Web browser 305 (step S1705). In order to call the top page of the Web application corresponding to the GUI button, the Web browser 305 accesses the URL set in step S1704 (step S1706).

By executing the above processing, a cooperation permission application corresponding to the GUI button instructed through the menu application 310 can call the top page of the Web application.

Basic Flow of Service Provider

Figure 14:
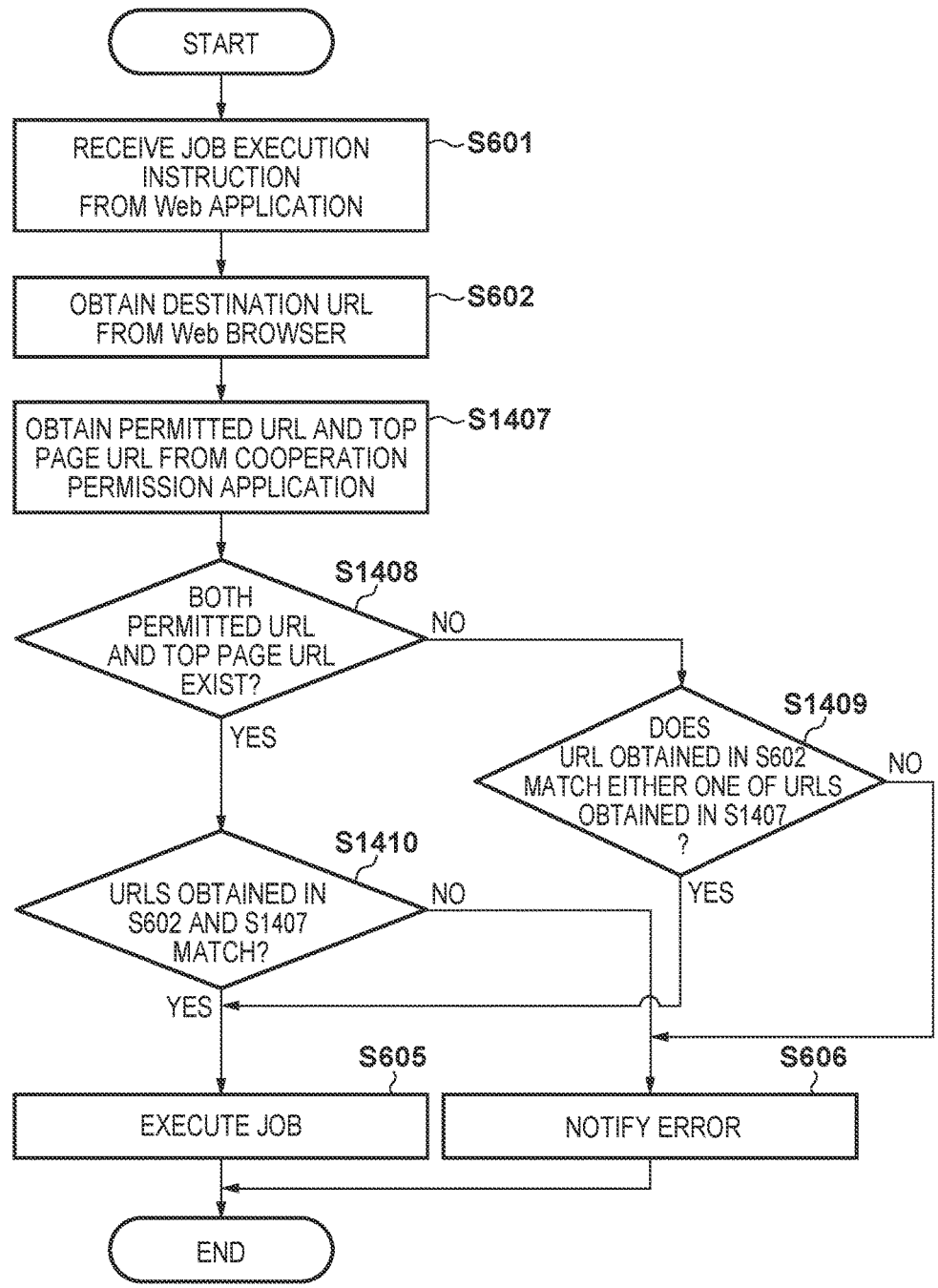
FIG. 14 is a sequence diagram of the image processing system according to the third embodiment of the present invention.

Next, the basic flow of the service provider 308 will be described with reference to FIG. 14. Note that FIG. 14 is obtained by adding a flow to FIG. 6. Flows that are not particularly described are the same as those in FIG. 6. Note that in this description, added difference will be described. The procedure in FIG. 14 corresponds to steps S507 to S509 in FIG. 12.

In step S1407, the service provider 308 obtains the permitted URL 441 and a top page URL (i.e., the URL 451 for Web application) from the cooperation permission application 450. This step corresponds to step S1202 in FIG. 12. The top page URL has been described with reference to FIG. 4C and the description thereof is omitted. In step S1408, the service provider 308 determines whether or not there are two URLs. Specifically, the service provider 308 determines whether or not two or more URLs have been obtained in step S1407. In the case where there is only one URL, the procedure advances to step S1410. In the case where there are two or more URLs, the procedure advances to step S1409. Note that steps S1410, S605 and S606 are not different from S604, S605 and S606 in FIG. 6, and thus the description thereof is omitted. If no URL is included, the procedure branches to step S606.

In step S1409, the service provider 308 determines whether or not either the URL 451 for Web application or the permitted URL 441 matches the destination URL. In the case where at least one of the URL 451 for Web application and the permitted URL 441 matches the destination URL, the procedure advances to step S605. In the case where neither matches the destination URL, the procedure advances to step S606. This step corresponds to step S1309 in FIG. 5. Note that in the case where URLs are compared in steps S604 and S1409, comparison is performed based not on URL complete matching but on partial matching. Specifically, comparison is performed based on matching of a string that makes it possible to identify the site of the service. This is because comparison in units of sites is basically expected, but comparison based on URL complete matching will result in comparison in units of site pages. Therefore, only a relevant page is permitted. In contrast, if a string that makes it possible to identify a service in units of service sites is compared based on partial matching, the relevant site can be properly compared in units of sites. For example, comparison is performed up to the most significant folder. Note that it is sufficient that either the top page URL or the permitted URL matches the destination URL.

As described above, in the image processing system in the third embodiment, a cooperation permission application is provided with a function for connecting to a Web application. Therefore, a specific cooperation permission application and a specific Web application are associated with each other, and the specific cooperation permission application is started, thereby enabling use of the corresponding Web application. Furthermore, the cooperation permission application manages an authority to access the resources of the MFP granted to the Web application with which the cooperation permission application is associated. Therefore, it becomes possible to know whether or not the URL for Web application to be connected is permitted for cooperation (whether or not the cooperation permission application corresponding to the URL for Web application has been installed), even if determination processing by the service provider is not performed (step S507 in FIG. 5). A top page URL is necessarily registered in a cooperation permission application, and in this embodiment, access to the resources of the MFP from the top page is permitted. This is because if the cooperation permission application is installed in the MFP, it can be determined that the Web service associated therewith is permitted for cooperation.

Moreover, the user no longer need to know a Web application URL specified for each Web application 1001 in advance. Therefore, it is possible to simplify the steps for connecting to the Web application, and reduce the complication of operability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-004614, filed Jan. 13, 2016 and Japanese Patent Application No. 2016-184689, filed Sep. 21, 2016 which are hereby incorporated by reference herein in their entirety.

What is claimed is:

1. An information processing apparatus comprising:
at least one memory storing instructions; and
at least one processor that, upon execution of the stored instructions, functions as
a service request unit configured to be capable of requesting a service from a connected external server;
a service provision unit configured to provide a service to outside in accordance with a request by the external server; and
a holding unit configured to hold identification information of a service requester to which service provision by the service provision unit is permitted, and to be installable and uninstallable, wherein
the service provision unit determines, with reference to the identification information held by the holding unit, whether or not service provision to the service requester is permitted, and in a case where it is determined that the service provision is permitted, provides the requested service,
the service request unit further obtains and displays display screen information with respect to the external server, and
the service provision unit obtains, from the service request unit, identification information of a service request destination from which the service request unit has requested a service, compares at least part of the obtained identification information of the service request destination with at least part of identification information held as identification information of the service requester by the holding unit, and if the at least part of the obtained identification information of the service request destination and the at least part of the identification information held by the holding unit match, determines that service provision to the service requester is permitted.

2. The information processing apparatus according to claim 1, wherein
the holding unit further holds, for each service requester, identification information of the destination of a service request made by the service request unit, in addition to the identification information of the service requester, and
the service request unit accesses the identification information of the destination of the service request in order to make the service request.

3. The information processing apparatus according to claim 2, wherein
in a case where the identification information of the service requester and the identification information of the service request destination are the same, the holding unit holds at least one of the identification information of the service requester and the identification information of the service request destination as the identification information of the service requester and the identification information of the service request destination.

4. The information processing apparatus according to claim 2, wherein
the service provision unit obtains, from the service request unit, identification information of a request destination from which the service request unit has requested a service, and determines whether service provision to the service requester is permitted based on any of the obtained identification information of the request destination, the identification information of the service requester held by the holding unit, or identification information of the request destination held by the holding unit.

5. The information processing apparatus according to claim 1, further comprising:
a framework in which an application can be installed, wherein
the holding unit is realized by a cooperation permission application that can be installed in and uninstalled from the framework.

6. The information processing apparatus according to claim 5, wherein
the cooperation permission application is installed in the framework, as one application that holds the service requester identification information for each service requester.

7. The information processing apparatus according to claim 5, wherein
a GUI button is registered in a main menu when an application is installed, a Web browser is opened when the cooperation permission application is started, and the service request destination is accessed based on the service request destination identification information held by the cooperation permission application.

8. The information processing apparatus according to claim 5, further comprising:
a license validation unit, wherein
the cooperation permission application is enabled in a case where the license validation unit determines that there is a license.

9. The information processing apparatus according to claim 5, wherein
the service request unit is realized by an application that can be installed and uninstalled in the framework, and
the service provision unit preferentially determines whether or not identification information of the application that realizes the service request unit is a value indicating a particular authority, and in a case of a value indicating a particular authority, determines that service provision to the service requester is permitted.

10. The information processing apparatus according to claim 1, further comprising:
   a scanner configured to scan an image; and
   a printer configured to print an image, wherein
   a service that is provided by the service provision unit includes a service that uses one of or both the scanner and the printer.

11. An image processing apparatus comprising:
   an application framework in which an application is installed and the installed application is executed;
   a scanner; and
   a printer, and further comprising,
   as applications installed in the application framework:
      a service provider configured to provide a function of the image processing apparatus to outside;
      a Web browser that accesses an external server and receives a service from a Web application; and
      a cooperation permission application configured to hold access information for accessing a top page of the Web application, wherein
   the service provider determines, with reference to the access information for accessing a top page of the Web application, whether or not service provision to the Web application is permitted, and in a case where it is determined that the service provision is permitted, provides a requested service,
   the Web browser accesses an external server, obtains and displays display screen information, and
      the service provider obtains, from the Web browser, access information of a target which the Web browser accessed, compares at least part of the access information of the target which the Web browser accessed with at least part of the access information for accessing the top page of the Web application, and if the at least part of the obtained access information of the target and the at least part of the access information for accessing the top page of the Web application match, determines that service provision to the Web browser is permitted.

12. The image processing apparatus according to claim 11, wherein,
   the cooperation permitting application further stores access information for identifying a Web application to which the service provision by the image processing apparatus is permitted,
   the service provider determines whether the service provision to the Web application is permitted based on the obtained access information of the target to which the Web browser accessed and the access information for accessing the top page of the Web application, and provides a service in a case where the service provision is determined to be permitted, and
   wherein the service provider obtains, from the Web browser, access information of a target which the Web browser accessed, and determines whether service provision to the Web browser is permitted based on any of the obtained identification information of the target which the Web browser accessed, the access information for accessing the top page of the Web application, or the access information for identifying the Web application to which the service provision is permitted.

13. The information processing apparatus according to claim 12, wherein the access information is a URL.

14. A control method in an information processing apparatus, comprising:
   requesting a service by a service request unit from a connected external server;
   providing a service by a service provision unit to outside in accordance with a request by the external server; and
   holding identification information of a service requester to which service provision in the providing of the service is permitted, using a holding unit configured to hold the identification information and to be installable and uninstallable, wherein in the providing of the service, whether or not service provision to the service requester is permitted is determined with reference to the identification information held by the holding unit, and in a case where it is determined that the service provision to the service requester is permitted, the requested service is provided,
   in the requesting of the service, the external server is accessed, and display screen information is obtained and displayed, and
      the service provision unit obtains, from the service request unit, identification information of a service request destination from which the service request unit has requested a service, compares at least part of the obtained identification information of the service request destination with at least part of identification information held as identification information of the service requester by the holding unit, and if the at least part of the obtained identification information of the service request destination and the at least part of the identification information held by the holding unit match, determines that service provision to the service requester is permitted.

15. The control method in an information processing apparatus according to claim 14, wherein
   the holding unit further holds, for each service requester, identification information of a service request destination of a request made by the service request unit, in addition to the identification information of the service requester,
   in the providing of the service, the identification information of the service request destination is accessed for a service request.

16. A non-transitory computer-readable medium that stores a program for causing a computer to execute a control method, the method comprising:
   requesting a service by a service request unit from a connected external server;
   providing a service by a service provision unit to outside in accordance with a request by the external server; and
   holding identification information of a service requester to which service provision in the providing of the service is permitted, using a holding unit configured to hold the identification information and to be installable and uninstallable, wherein in the providing of the service, whether or not service provision to the service requester is permitted is determined with reference to the identification information held by the holding unit, and in a case where it is determined that the service provision to the service requester is permitted, the requested service is provided,
   in the requesting the service, the external server is accessed, and display screen information is obtained and displayed, and
      the service provision unit obtains, from the service request unit, identification information of a service request destination from which the service request unit has requested a service, compares at least part of the obtained identification information of the service request destination with at least part of identification information held as identification information of the service requester by the holding unit, and if the at least part of the obtained identification information of the service request destination and the at least part of the identification information held by the holding unit match, determines that service provision to the service requester is permitted.

\* \* \* \* \*